(12) United States Patent
Greco et al.

(10) Patent No.: US 8,806,393 B1
(45) Date of Patent: Aug. 12, 2014

(54) GENERATION OF DESIGN SHAPES FOR CONFINING STITCH-INDUCED VIA STRUCTURES

(71) Applicant: International Business Machines Corporation, Armonk, NY (US)

(72) Inventors: Stephen E. Greco, Lagrangeville, NY (US); Rasit O. Topaloglu, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/849,764

(22) Filed: Mar. 25, 2013

(51) Int. Cl.
*G06F 17/50* (2006.01)
(52) U.S. Cl.
USPC .................................. 716/54; 716/52; 716/55
(58) Field of Classification Search
USPC ................................................ 716/52, 54–55
See application file for complete search history.

(56) References Cited

U.S. PATENT DOCUMENTS

| 6,664,011 B2 | 12/2003 | Lin et al. | |
|---|---|---|---|
| 7,224,030 B2 | 5/2007 | Schroeder | |
| 7,410,736 B2 | 8/2008 | Bleeker et al. | |
| 7,927,928 B2 | 4/2011 | Pierrat | |
| 8,516,407 B1 * | 8/2013 | Wang et al. | 716/54 |
| 8,631,379 B2 * | 1/2014 | Chen et al. | 716/132 |
| 2011/0197168 A1 * | 8/2011 | Chen et al. | 716/50 |

* cited by examiner

*Primary Examiner* — Naum Levin
(74) *Attorney, Agent, or Firm* — Scully, Scott, Murphy & Presser, P.C.; Catherine Ivers, Esq.

(57) ABSTRACT

A design layout includes a conductive line level, at least one underlying conductive line level, and a via design level for vertically interconnecting structures in the conductive line level and the at least one underlying conductive line level. Stitch shapes are identified in the conductive line level. Test shapes are generated to determine whether vias formed in the area of the stitch shapes can extend to the at least one underlying conductive line level without contacting preexisting design shapes in the at least one underlying conductive line level structure and whether a new design shape can be inserted into the at least one underlying conductive line level with electrical isolation. As many new design shapes are inserted as possible to prevent extension of collateral via structures below the top surface of underlying metal line structures in a physical metal interconnect structure implementing the design layout.

20 Claims, 19 Drawing Sheets

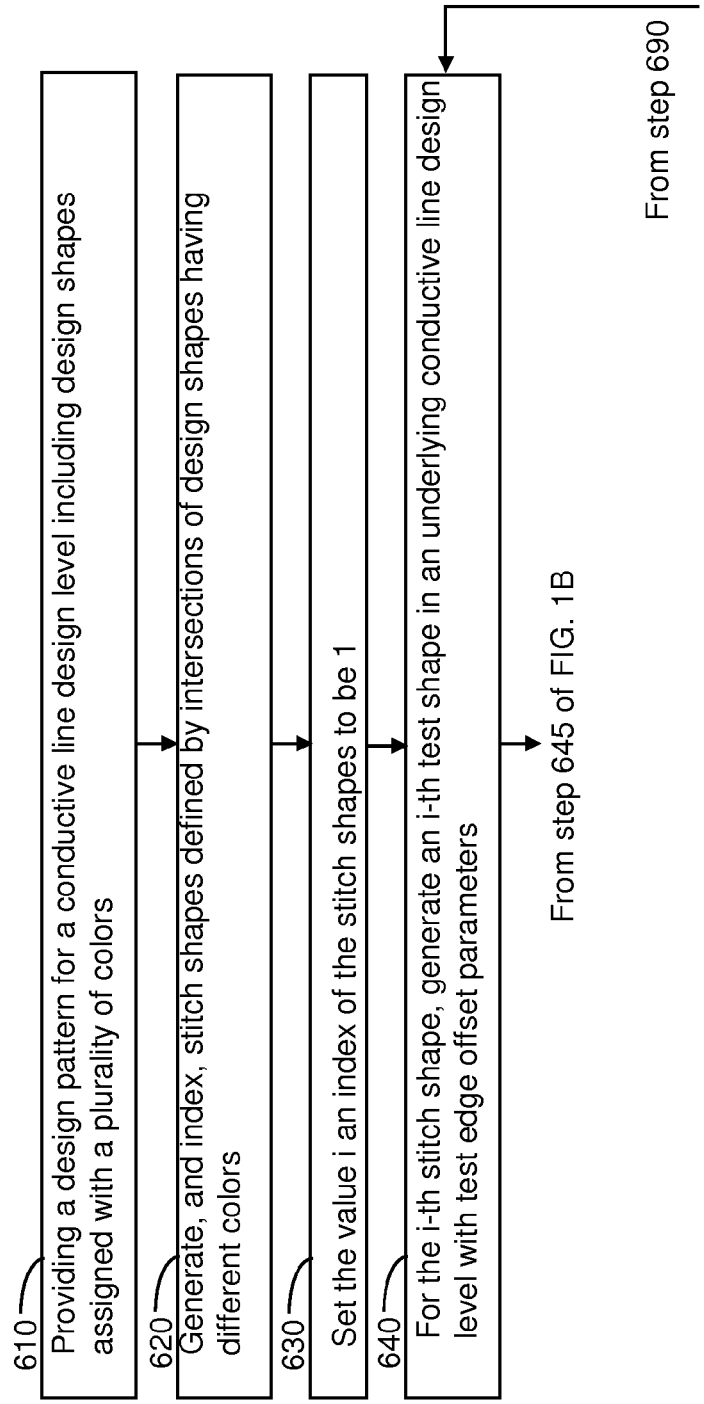

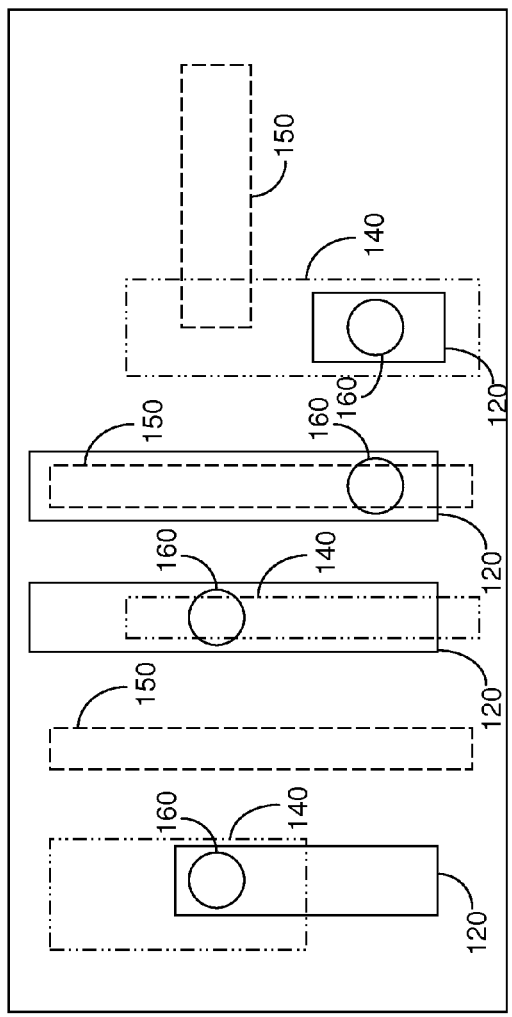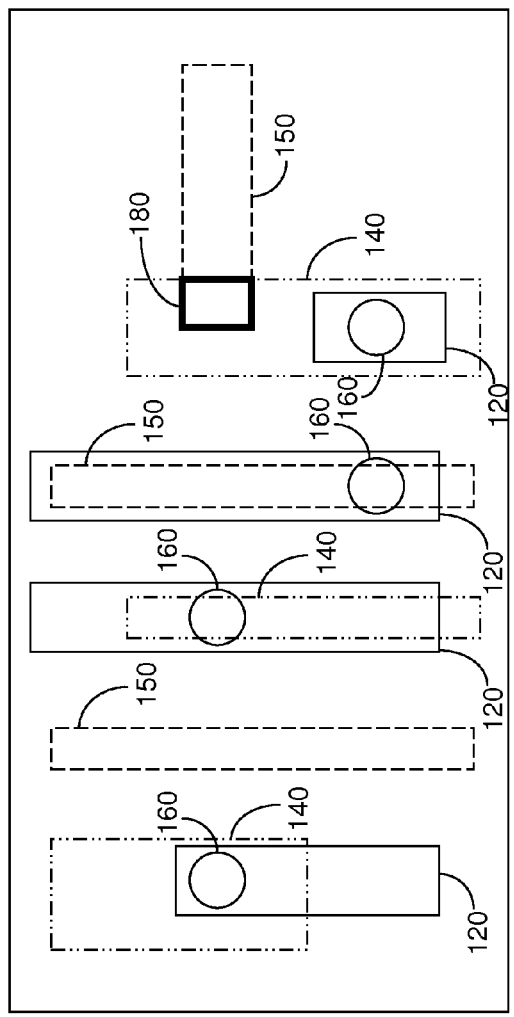

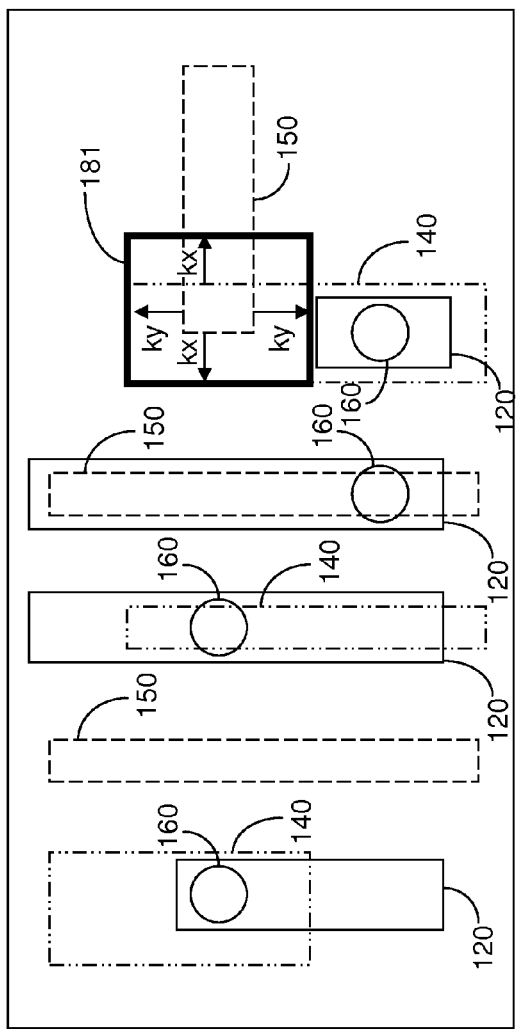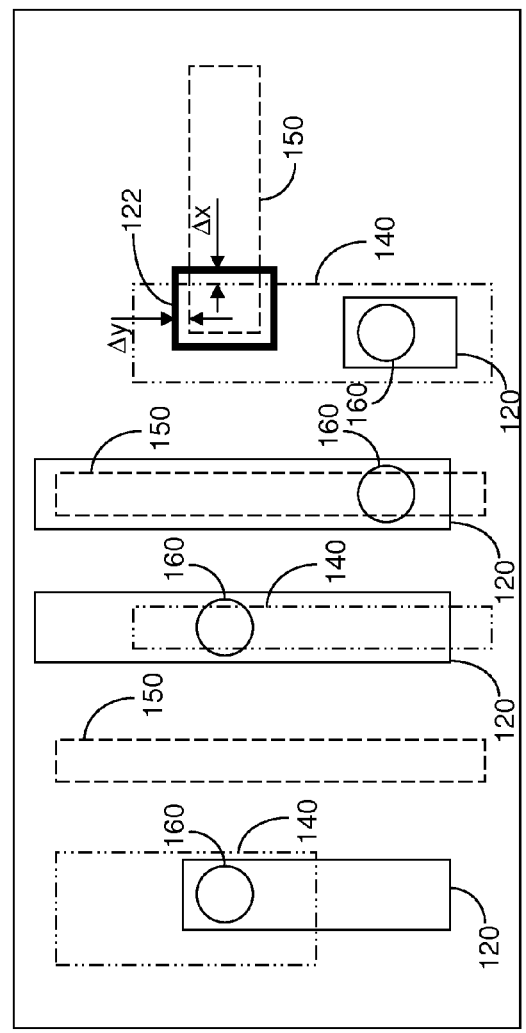

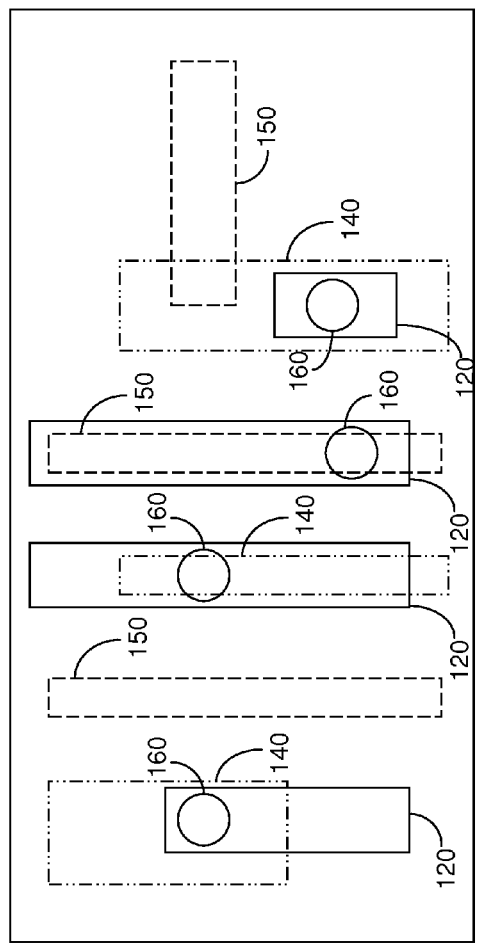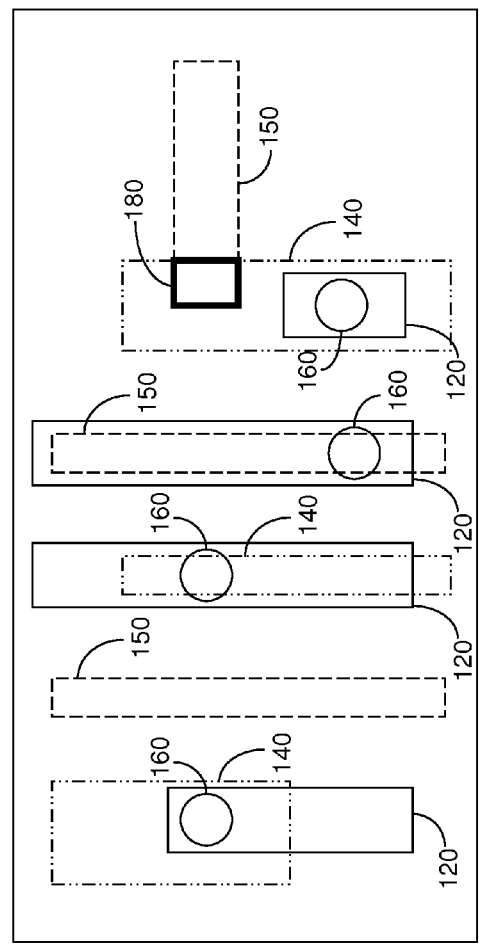

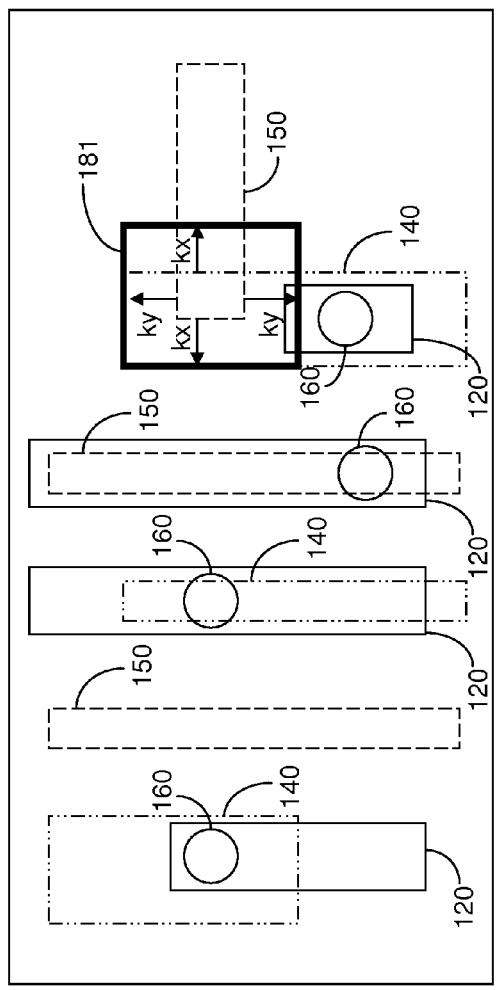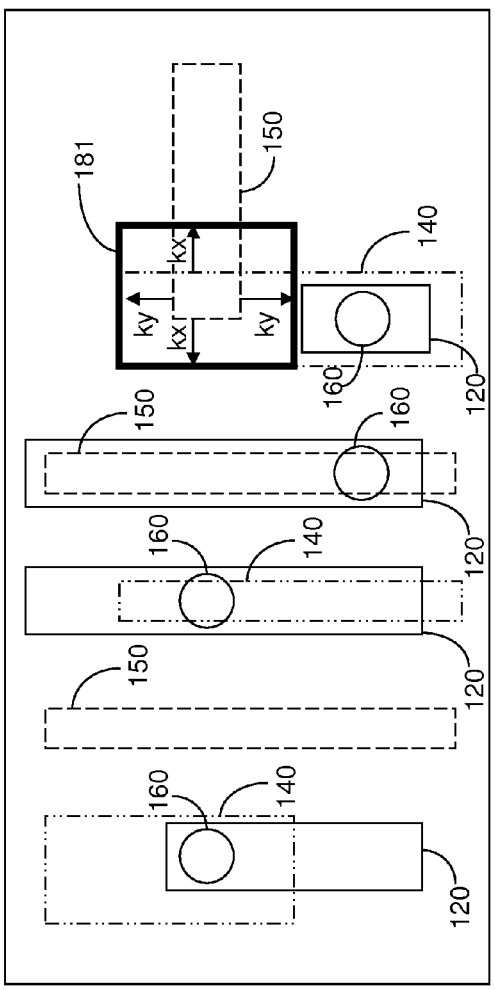

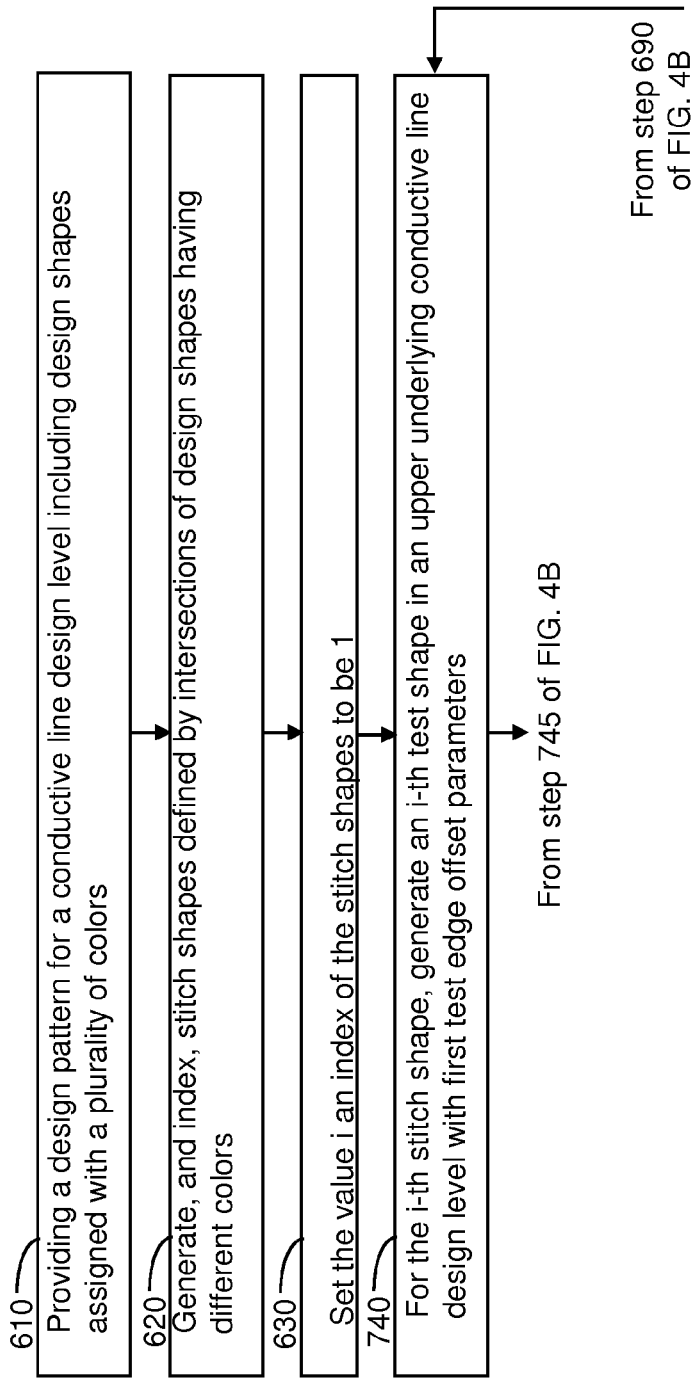

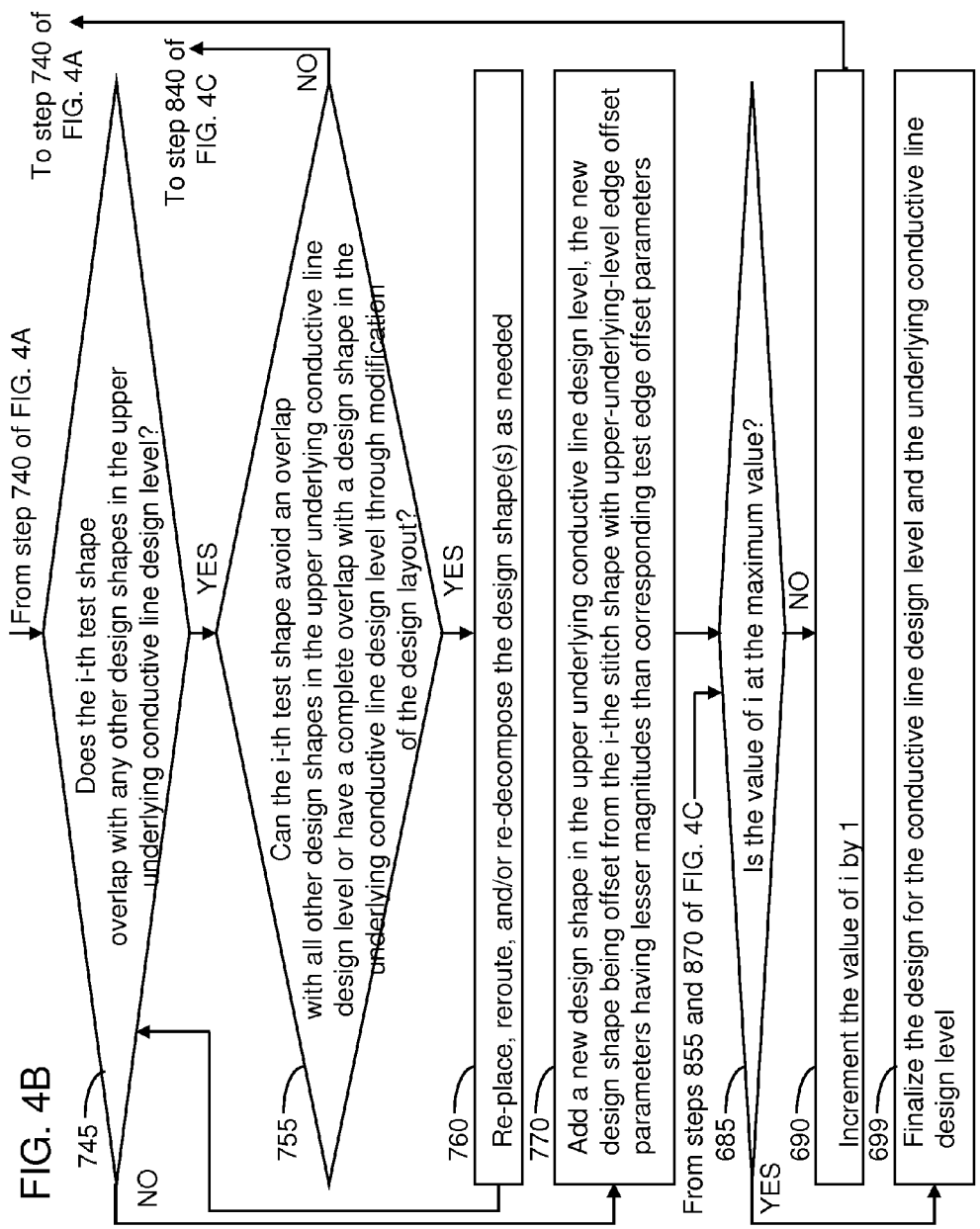

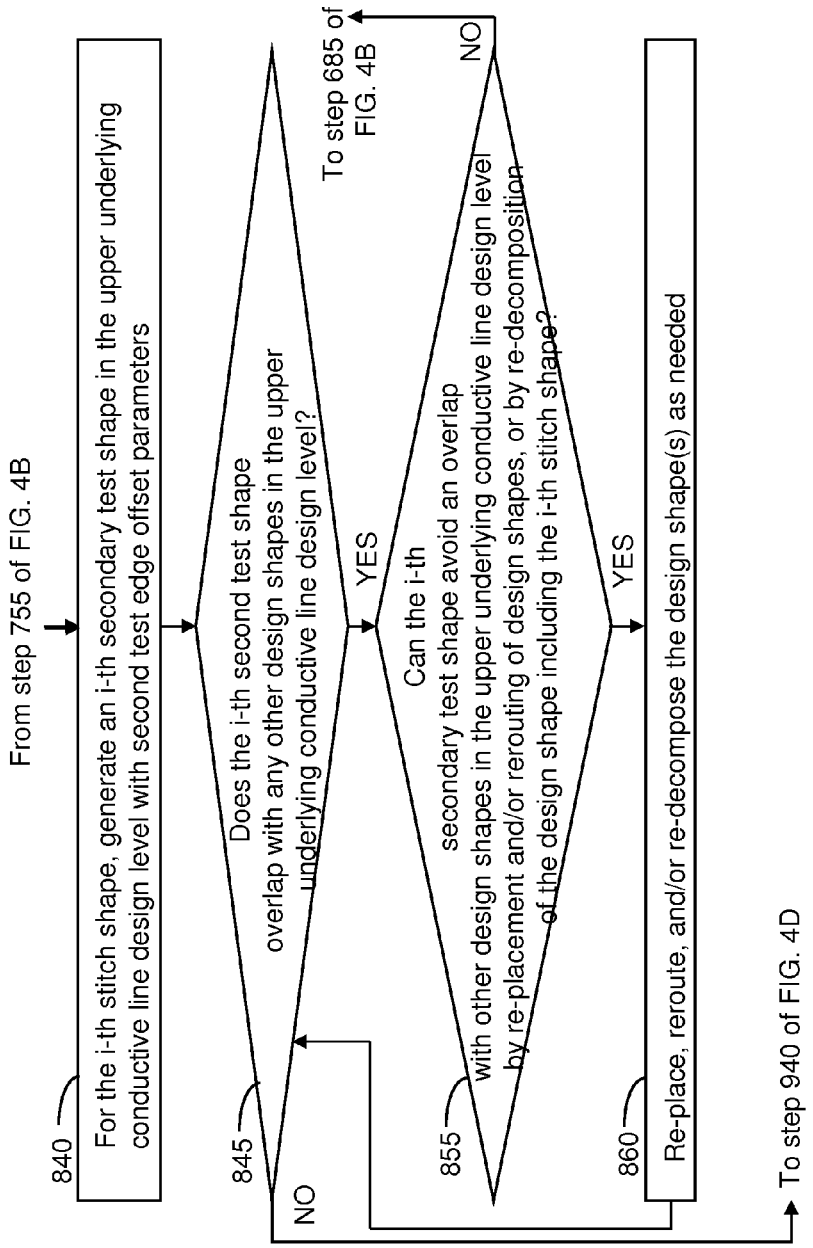

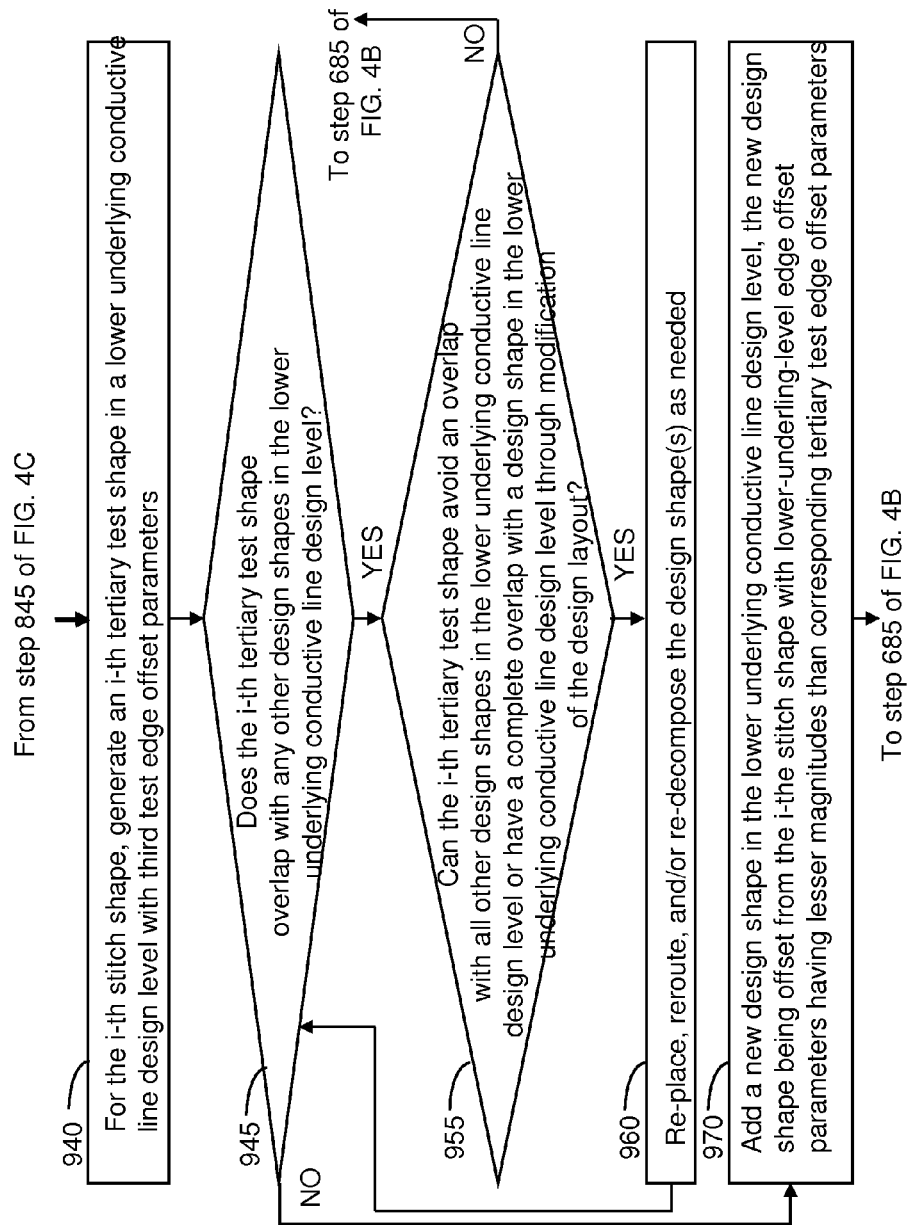

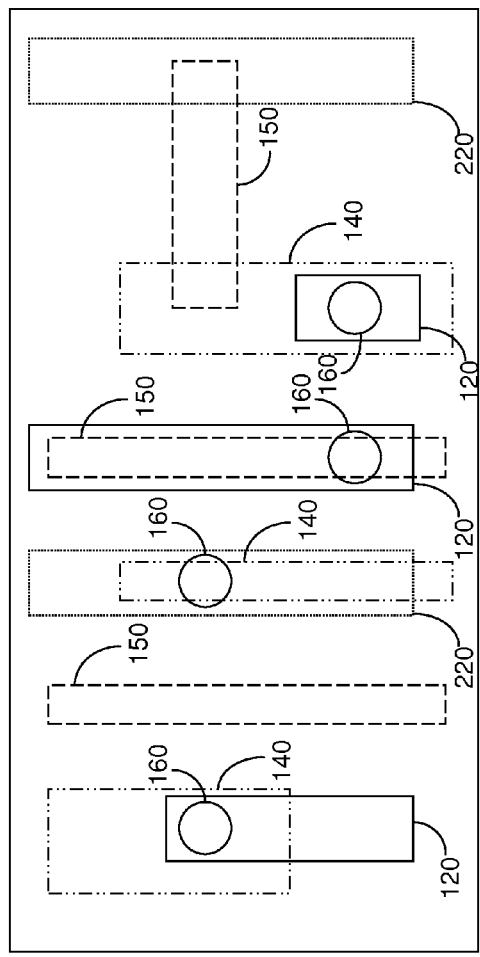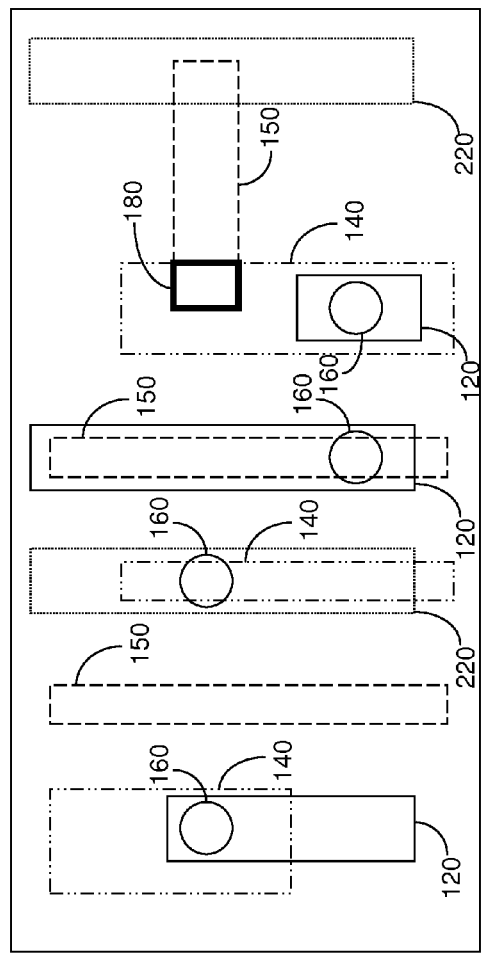

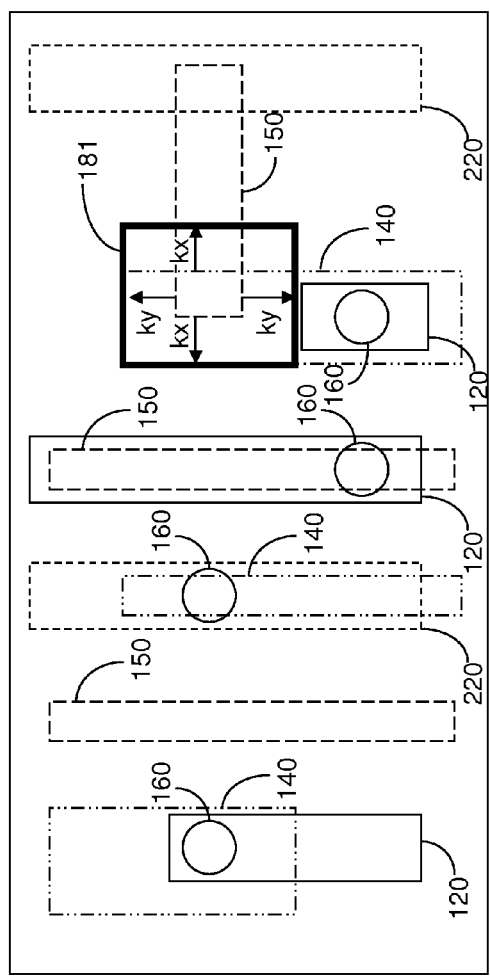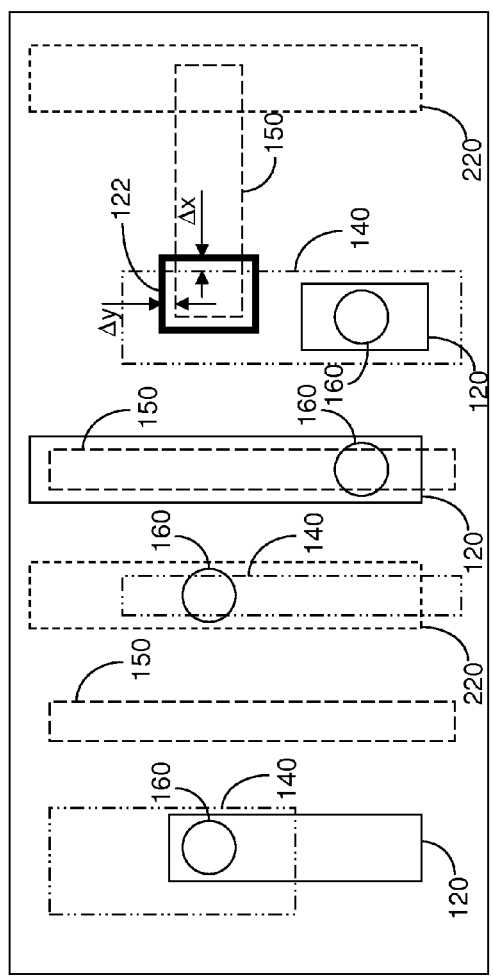

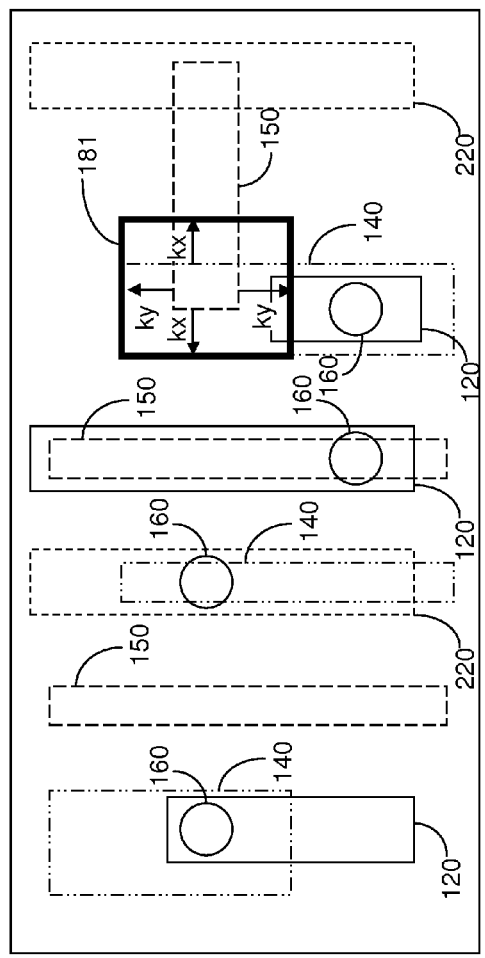
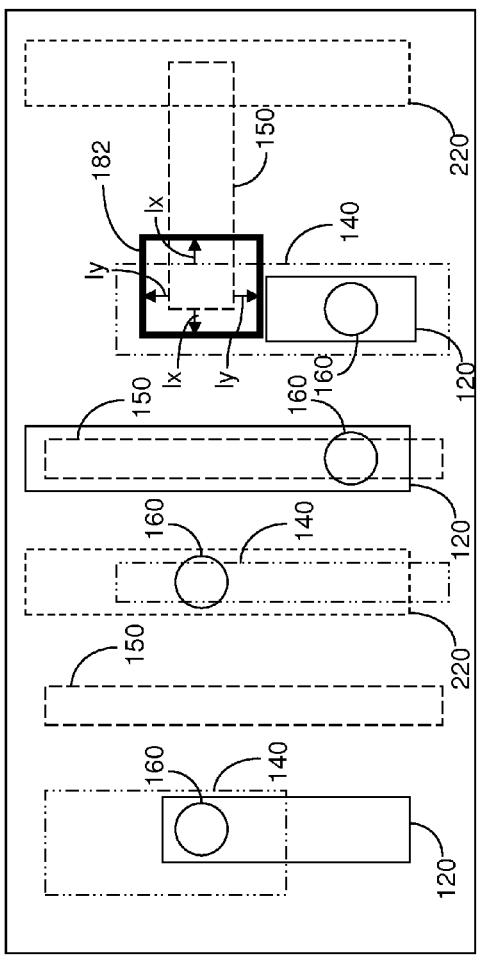

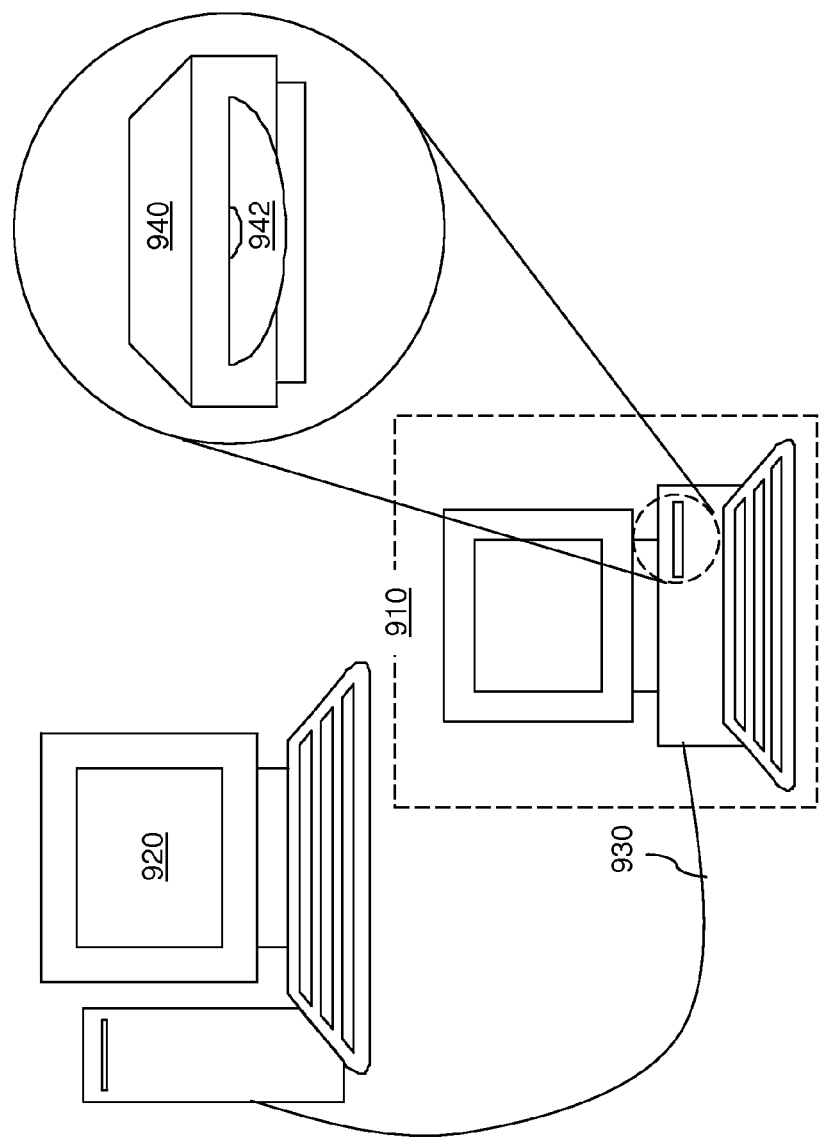

GENERATION OF DESIGN SHAPES FOR CONFINING STITCH-INDUCED VIA STRUCTURES

BACKGROUND

The present disclosure relates to a method of generating a design layout including design shapes that confine stitch-induced via structures above an underlying conductive line level, and a system for implementing the same.

Printing a lithographic pattern having pitches below lithographic limits of traditional lithographic techniques, e.g., below 80 nm, does not yield patterns with high fidelity. To overcome this problem, a multi-exposure technique in which multiple lithographic exposures are performed for a single level, can be employed. In order to implement the multi-exposure technique, a given design shape in a design level may be decomposed into multiple decomposed design shapes. The multiple decomposed design shapes are assigned to different lithographic masks that correspond to different "colors" that collectively constitute the design level. The process of decomposing design shapes into groups of decomposed design shapes corresponding to different colors is referred to as "coloring."

A design shape in a design level can thus includes multiple decomposed shapes corresponding to different colors. The number of colors corresponds to the number of lithographic masks to be employed to print the lithographic pattern corresponding to the design shapes in the design level. Each lithographic mask includes decomposed design shapes of the same color. Each lithographic exposure adds the pattern corresponding to decomposed design shapes of a corresponding color to a hard mask layer. If performed correctly, the multiple lithographic exposures add the patterns of the decomposed design shapes of all the colors of the design level to generate the pattern of the original design shape in the design level.

To ensure that the multiple lithographic exposures result in replication of the original pattern despite overlay variations and variations in other lithographic parameters, generation of areas of overlap are built into the decomposition process. The process of generation of areas of overlap between design shapes having different colors and derived from decomposition of an original design shape in the given design level is referred to as "stitching." An area of overlap between design shapes having different colors is referred to as a "stitching area" or a "stitch."

Lithographic pattern transfer is implemented by transferring a pattern in a photoresist layer into a material layer by an etch process. Stitches correspond to regions in which multiple etch processes are performed in a same material layer. Thus, a region in a physical structure corresponding to a stitch are prone to be etched through due to multiple etch processes performed therein if sufficient process variations occur in the deposition of the material layer prior to lithographic processes or during the etch processes. If a region corresponding to a stitch is etched through unintentionally, a via structure is collaterally formed during a via etch process when a via structure should not be formed. Formation of such a collateral via structure can create electrical shorts in a metal interconnect structure among components that should be electrically isolated. Further, such a collateral via can be narrow and prevent deposition of a diffusion barrier layer at a thickness sufficient to prevent diffusion of metals (e.g., copper). In that case, metal can diffuse through thin portions of the diffusion barrier layer and diffuse into dielectric materials embedding metal interconnect structures or into semiconductor materials in a semiconductor substrate including semiconductor devices and cause reliability issues. Thus, a method for systematically preventing or minimizing formation of collateral via structures is desired.

SUMMARY

A design layout including a conductive line level, at least one underlying conductive line level, and a via design level for vertically interconnecting structures in the conductive line level and the at least one underlying conductive line level is provided. Stitch shapes are identified in the conductive line level. Test shapes are generated to determine whether vias formed in the area of the stitch shapes can extend to the at least one underlying conductive line level without contacting pre-existing design shapes in the at least one underlying conductive line level structure and whether a new design shape can be inserted into the at least one underlying conductive line level with electrical isolation. As many new design shapes are inserted as possible to prevent extension of collateral via structures below the top surface of underlying metal line structures in a physical metal interconnect structure implementing the design layout.

According to an aspect of the present disclosure, a method for generating shapes for a design layout is provided. In a first step, a design layout is provided, which includes a conductive line level, at least one underlying conductive line level, and a via design level. The conductive line level includes conductive-line-level design shapes that represent conductive line structures in a conductive line level in a target interconnect structure. Each of the at least one underlying conductive line level includes underlying-conductive-line-level design shapes that represent underlying conductive line structures in an underlying conductive line level located underneath the conductive line level in the target interconnect structure. The via design level includes via-level design shapes that represent via structures to vertically interconnect the conductive line structures and the underlying conductive line structures. The conductive-line-level design shapes include a plurality of decomposed design shapes having different colors that correspond to different lithographic masks. In a second step, stitch shapes are generated for each region in which a decomposed design shape within the conductive line level intersect with another decomposed design shape having a different color. In a third step, for each selected stitch shape among the generated stitch shapes, at least one test shape is generated for each of the selected stitch shape. Each edge of the at least one test shape is laterally offset from an edge of the selected stitch shape by a predetermined edge offset parameter. In a fourth step, for each generated at least one test shape, a test is performed to determine whether an overlap exists between one of the at least one generated test shape and any of the underlying-conductive-line-level design shapes in the at least one underlying conductive line level. In a fifth step, the design layout is modified so that a design shape in the at least one underlying conductive line level occupies an entirety of an area of the selected stitch shape based on a result of the test. At least one step among the second, third, fourth, and fifth steps is performed employing an apparatus including one or more processors in communication with a memory and configured to perform the at least one step.

According to another aspect of the present disclosure, an apparatus for generating shapes for a design layout is provided. The apparatus includes one or more processors in communication with a memory and configured to run an automated program. In a first step of the automated program, a design layout is provided, which includes a conductive line level, at least one underlying conductive line level, and a via design level. The conductive line level includes conductive-line-level design shapes that represent conductive line structures in a conductive line level in a target interconnect structure. Each of the at least one underlying conductive line level includes underlying-conductive-line-level design shapes that represent underlying conductive line structure in an underlying conductive line level located underneath the conductive line level in the target interconnect structure. The via design level includes via-level design shapes that represent via structures to vertically interconnect the conductive line structures and the underlying conductive line structures. The conductive-line-level design shapes include a plurality of decomposed design shapes having different colors that correspond to different lithographic masks. In a second step of the automated program, stitch shapes are generated for each region in which a decomposed design shape within the conductive line level intersect with another decomposed design shape having a different color. In a third step of the automated program, for each selected stitch shape among the generated stitch shapes, at least one test shape is generated for each of the selected stitch shape. Each edge of the at least one test shape is laterally offset from an edge of the selected stitch shape by a predetermined edge offset parameter. In a fourth step of the automated program, for each generated at least one test shape, a test is performed to determine whether an overlap exists between one of the at least one generated test shape and any of the underlying-conductive-line-level design shapes in the at least one underlying conductive line level. In a fifth step of the automated program, the design layout is modified so that a design shape in the at least one underlying conductive line level occupies an entirety of an area of the selected stitch shape based on a result of the test.

BRIEF DESCRIPTION OF SEVERAL VIEWS OF THE DRAWINGS

FIG. 1A is a first part of a first flow chart illustrating a series of steps for generating design shapes for line level structures for preventing stitch-induced via structures from intruding into an underlying dielectric material layer according to a first embodiment of the present disclosure.

FIG. 2A is a plan view of a first exemplary design layout as provided according to the first embodiment of the present disclosure.

FIG. 2B is a plan view of the first exemplary design layout after identification of a stitching area and generation of a stitch shape according to the first embodiment of the present disclosure.

FIG. 2C is a plan view of the first exemplary design layout after generation of a test shape from the stitch shape according to the first embodiment of the present disclosure.

FIG. 2D is a plan view of the first exemplary design layout after addition of a new design shape in the underlying conductive line level according to the first embodiment of the present disclosure.

FIG. 3A is a plan view of a second exemplary design layout as provided according to the first embodiment of the present disclosure.

FIG. 3B is a plan view of the second exemplary design layout after identification of a stitching area and generation of a stitch shape according to the first embodiment of the present disclosure.

FIG. 3C is a plan view of the second exemplary design layout after generation of a test shape from the stitch shape according to the first embodiment of the present disclosure.

FIG. 3D is a plan view of the second exemplary design layout after re-placement of design shapes to avoid any overlap of design shapes in the underlying conductive line level according to the first embodiment of the present disclosure.

FIG. 4A is a first part of a second flow chart illustrating the steps for generating design shapes for structures for stitch-induced via structures according to a second embodiment of the present disclosure.

FIG. 4B is a second part of the second flow chart according to the second embodiment of the present disclosure.

FIG. 4C is a third part of the second flow chart according to the second embodiment of the present disclosure.

FIG. 4D is a fourth part of the second flow chart according to the second embodiment of the present disclosure.

FIG. 5A is a plan view of a third exemplary design layout as provided according to the second embodiment of the present disclosure.

FIG. 5B is a plan view of the third exemplary design layout after identification of a stitching area and generation of a stitch shape according to the second embodiment of the present disclosure.

FIG. 5C is a plan view of the third exemplary design layout after generation of a test shape from the stitch shape according to the second embodiment of the present disclosure.

FIG. 5D is a plan view of the third exemplary design layout after addition of a new design shape in an upper underlying conductive line level according to the second embodiment of the present disclosure.

FIG. 6A is a plan view of a fourth exemplary design layout after generation of a test shape from the stitch shape according to a third embodiment of the present disclosure.

FIG. 6B is a plan view of the fourth exemplary design layout after generation of a secondary test shape from the stitch shape according to the third embodiment of the present disclosure.

FIG. 7 illustrates an exemplary apparatus that can be employed to implement the methods of various embodiments of the present disclosure.

DETAILED DESCRIPTION

Figure 1B:
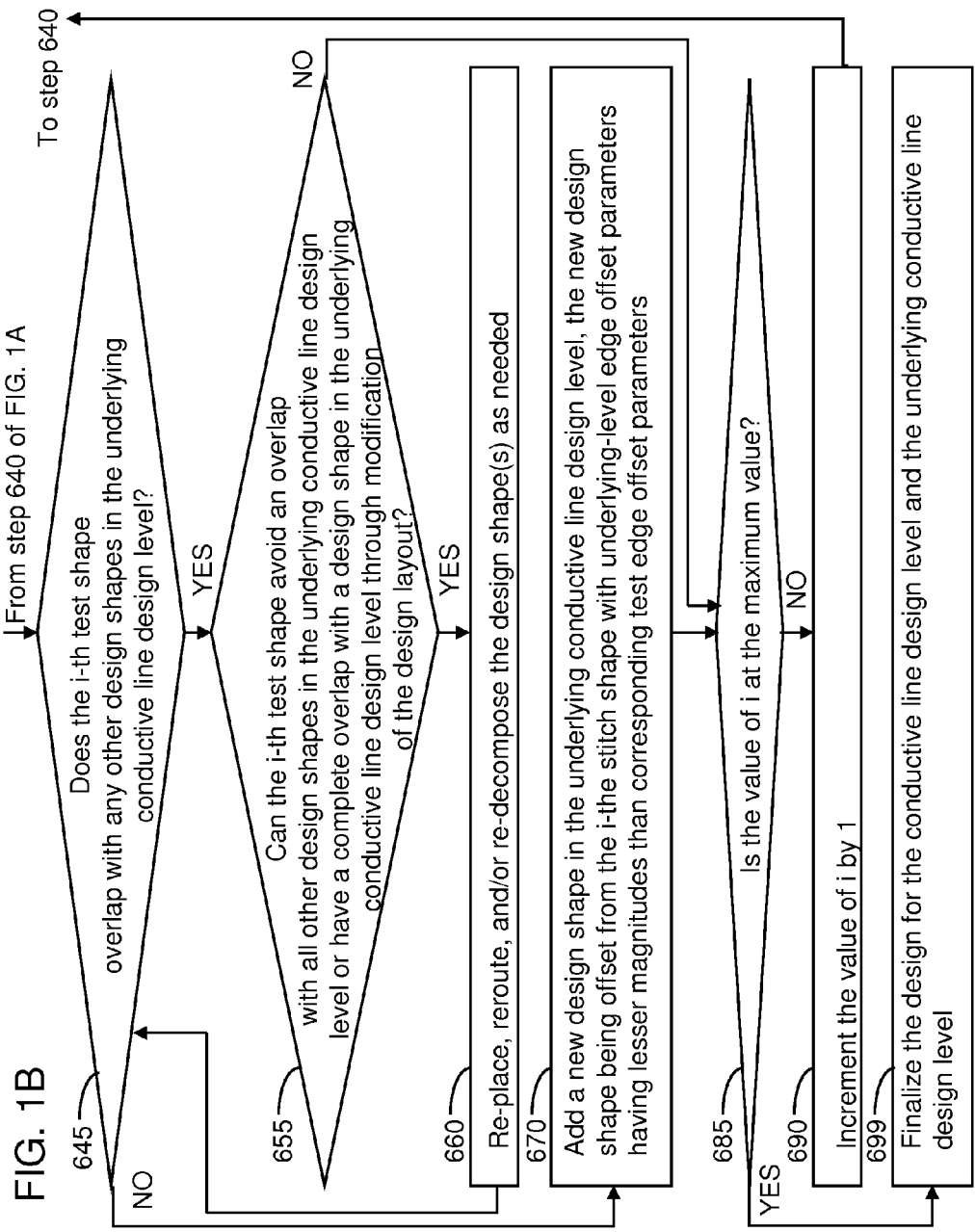
FIG. 1B is a second part of the first flow chart according to the first embodiment of the present disclosure.

As stated above, the present disclosure relates to a method of generating a design layout including design shapes that confine stitch-induced via structures above an underlying conductive line level, and a system for implementing the same. Aspects of the present disclosure are now described in detail with accompanying figures. It is noted that like and corresponding elements are referred to by like reference numerals. The drawings are not drawn to scale. Ordinals are used merely to distinguish among similar elements, and different ordinals may be employed across the specification and the claims of the instant application.

FIGS. 1A and 1B include a first flow chart illustrating a series of steps for generating design shapes for line level structures in an underlying conductive line level for preventing stitch-induced via structures from intruding into an underlying dielectric material layer according to an embodiment of the present disclosure. FIGS. 4A, 4B, 4C, and 4D include a second flow chart illustrating a series of steps for generating design shapes for line level structures in one of two underlying conductive line levels for preventing stitch-induced via structures from intruding into an underlying dielectric material layer according to an embodiment of the present disclosure.

Referring to step 610, a design layout is provided, which includes design shapes representing various conductive structures to be formed in a target interconnect structure. As used herein, a "design layout" refers to a collection of data that represents a geometrical relationship between various structural elements of conductive structures embedded in dielectric material layers that can be manufactured on a substrate. As used herein, a "design level" is a level within a design layout that includes geometrical shapes that are related, directly or indirectly, to a same set of processing steps for forming physical objects on a substrate. The geometrical shapes may be represented in a graphics format or in a non-graphics format. As used herein, a "mask level" is identical to a design level if mask decomposition is not employed, or is a subset of a design level corresponding to a same color if mask decomposition is employed in the design level. As used herein, an "interconnect structure" refers to a structure in which a plurality of conductive structures are embedded in at least one dielectric material layer to provide at least one conductive path. As used herein, a "target interconnect structure" is an ideal interconnect structure in which all structural and compositional parameters comply with a design layout therefor and process assumptions employed in a manufacturing process. As used herein, a "line level structure" refers to a conductive structure that extends in a horizontal direction within a same level, i.e., between two horizontal planes separated by a thickness of the line level structure, of an interconnect structure. As used herein, a "line level" refers to a level including at least one line level structure. As used herein, a "via level structure" refers to a conductive structure that extends in a vertical direction between two different line levels. As used herein, a "via level" refers to a level between two vertically adjacent line levels.

The various steps of the flow chart can be implemented by an apparatus including one or more processors in communication with a memory, i.e., a memory device. The one or more processors can be configured to run an automated program that includes instructions for implementing one, a plurality, or all of the steps of the first and second flow charts. One or more or all of the steps described below can be performed employing an apparatus including one or more processors in communication with a memory and configured to perform the corresponding step(s).

If an automated program that runs on an apparatus employing one or more processors is employed, the automated program can be configured to receive the design layout. Exemplary design layouts as provided are illustrated in FIGS. 2A, 3A, and 5A. Specifically, FIG. 2A illustrates a first exemplary design layout, FIG. 3A illustrates a second exemplary design layout, and FIG. 5A illustrates a third exemplary design layout.

The design layout includes a conductive line level, at least one underlying conductive line level, and a via design level. The conductive line level includes conductive-line-level design shapes that represent conductive line structures in a conductive line level in a target interconnect structure. The conductive line level is a line level that overlies at least another line level in an interconnect structure. The conductive line level is herein referred to as an M(x+1) level, in which x is an integer that represents the order, from bottom to top, of the conductive line level within the interconnect structure. X can be any non-negative integer. In addition, if a local interconnect level including local interconnect structures as known in the art is employed underneath an M1 level, such a local interconnect level is herein referred to as an M0 level. If two local interconnect levels located at different levels are employed underneath an M1 level, a lower local interconnect level is herein referred to as an M(−1) level and an upper local interconnect level is herein referred to as an M0 level.

The conductive-line-level design shapes include a plurality of decomposed design shapes having different colors that correspond to different lithographic masks. Each set of design shapes of the same color collectively provide a pattern for a lithographic mask. The collection of all sets of design shapes for the conductive-line-level design shapes collectively provide the entirety of the pattern for conductive line structures to be formed in the target interconnect structure. For example, the conductive-line-level design shapes can be M(x+1) level design shapes. The M(x+1) level design shapes can include M(x+1) level design shapes having a first color and physically manifested as a first pattern in a first lithographic mask, and M(X+1) level design shapes having a second color and physically manifested as a second pattern in a second lithographic mask. The M(x+1) level design shapes having the first color are herein referred to as first color M(x+1) level design shapes 140, and the M(x+1) level design shapes having the second color are herein referred to as second color M(x+1) level design shapes 150.

While the present disclosure is described employing two colors, variations of the present disclosure employing three or more colors for the conductive line level are expressly contemplated herein.

Each of the at least one underlying conductive line level includes underlying-conductive-line-level design shapes that represent underlying conductive line structures in an underlying conductive line level located underneath the conductive line level in the target interconnect structure. The underlying conductive line level is a single line level that underlies the conductive line level, i.e., the M(x+1) level. In one embodiment, the underlying conductive line level can be an Mx level that is the underlying line level that underlies the M(x+1) level and is most proximate to the M(x+1) level.

The underlying-conductive-line-level design shapes may have the same color (i.e., does not use mask decomposition techniques), or may include a plurality of decomposed design shapes having different colors that correspond to different lithographic masks (i.e., use mask decomposition techniques). The underlying-conductive-line-level design shapes can be Mx level design shapes 120.

The via design level includes via-level design shapes 160 that represent via structures to vertically interconnect the conductive line structures and the underlying conductive line structures.

In another embodiment, a plurality of underlying conductive line levels may be provided. The plurality of underlying conductive line levels may include an upper underlying conductive line level and a lower underlying conductive line level. In one embodiment, the upper underlying conductive line level can be an Mx level, and the lower underlying conductive line level can be an M(x−1) level. In this case, the underlying-conductive-line-level design shapes can be Mx level design shapes 120 and M(x−1) level design shapes 220.

Referring to step 620 of FIGS. 1A and 4A in view of FIGS. 2B, 3B, and 5B, stitch shapes 180 are generated and indexed. Stitch shapes 180 are generated for each region (area in the design layout) in which a decomposed design shape having a color and located within the conductive line level intersect with another decomposed design shape having a different color and located within the conductive line level. Specifically, the stitch shapes 180 are design shapes defined by the areal intersection of conductive-line-level design shapes having different colors, i.e., conductive-line-level design shapes assigned to different mask levels. For example, the stitch shapes 180 can include design shapes defined by the areal intersection of the first color M(x+1) level design shapes 140 and second color M(x+1) level design shapes 150. Each stitch shape is indexed, for example, employing natural numbers. For example, if a total of N stitch shapes 180 are identified, the N stitch shapes 180 can be numbered with the index i having a range from 1 to N. Each stitch shape 180 can be a polygon. In one embodiment, each stitch shape 180 can be a rectangle. While FIGS. 2B, 3B, and 5B illustrate only one stitch shape 180, in general, a plurality of stitch shapes 180 can be generated from the design layout.

Referring to steps 630-690 of FIGS. 1A and 1B and steps 630-970 of FIGS. 4A, 4B, 4C, and 4D, the index i is varied from 1 to N and the corresponding stitch shape 180 is sequentially selected. For each selected stitch shape 180, attempts are made to provide in the underlying conductive line level (e.g., the Mx level) or in one of the underlying conductive line levels (e.g., in one of the Mx level and M(x−1) level) a design shape that occupies the entirety of the area of the selected stitch shape 180. The design shape that occupies the entirety of the area of the selected stitch shape 180 can be a newly added design shape having a set of predetermined edge offset parameters according to the schemes of the first flow chart in FIGS. 1A and 1B. Alternately, the design shape that occupies the entirety of the area of the selected stitch shape 180 can be provided by re-placing a preexisting design shape in the underlying conductive line level (e.g., the Mx level) or in one of the underlying conductive line levels (e.g., in one of the Mx level and M(x−1) level) according to the schemes of the second flow chart in FIGS. 4A, 4B, 4C, and 4D.

For example, the value of the index i can be set to 1 at step 630 prior to modifying the provided design layout based on the stitch shapes 180.

Referring to step 640 of FIG. 1A and FIGS. 2C and 3C, for the i-th stitch shape 180, an i-th test shape 181 is generated in the underlying conductive line level, i.e., the Mx level. Each i-th test shape 181 is herein referred to as a primary test shape. The i-th test shape 181 is generated from the i-th stitch shape 180 by outwardly expanding each edge of the i-the stitch shape 180 by a test edge offset parameter selected from a predetermined set of test edge offset parameters. During iterative performance of step 640 as the index i runs from 1 to N, i.e., for each selected stitch shape among the generated stitch shapes, an i-th test shape 181 for each i-th stitch shape 180. Each edge of the i-th test shape 181 is laterally offset from an edge of the selected stitch shape 180 (i.e., the i-th stitch shape) by a predetermined edge offset parameter.

Each predetermined edge offset parameter is a scalar parameter derived from a minimum feature spacing in the underlying conductive line level, i.e., the Mx level. The predetermined set of test edge offset parameters can be orientation-dependent, i.e., dependent on the orientation of the edge of the selected stitch shape 180. For example, if an x-y Cartesian system is employed to denote coordinates in the design layout, an x-axis test edge offset parameter kx may be employed for all edges extending along a y-direction, and a y-axis test edge offset parameter ky may be employed for all edges extending along the x-direction. The value of the test edge offset parameters (e.g., kx and ky) may be determined based on the sum of a minimum feature spacing between adjacent conductive structures in the underlying conductive line level under the design rules applicable to the design layout and the overlay tolerance of lithographic processes for printing the M(x+1) level shapes relative to the Mx level shapes as defined by process assumptions that are specific to each manufacturing facility. In this case, the predetermined edge offset parameter along each direction can be a scalar not less than the sum of the minimum feature spacing in the underlying conductive line level (i.e., the Mx level) along the corresponding direction and the overlay tolerance of the lithographic processes for printing the M(x+1) level shapes relative to the Mx level shapes. For example, if the design rules require a minimum spacing of 60 nm between adjacent conductive line structures in the underlying conductive line level along the x-direction and a minimum spacing of 80 nm between adjacent conductive line structures in the underlying conductive line level along the y-direction, and if the overlay tolerance for lithographic processes that aligns patterns of the lithographic masks of the M(x+1) level (that correspond to the various colors of the decomposed design shapes in the M(x+1) level) relative to the pattern of the Mx level is 20 nm, the values of kx and ky can be 80 nm and 100 nm, respectively. In one embodiment, the predetermined edge offset parameter along each direction can be a scalar not less than the sum of the minimum feature spacing in the underlying conductive line level (i.e., the Mx level) along the corresponding direction and the overlay tolerance of the M(x+1) level patterns relative to the Mx level patterns.

Referring to step 645 of FIG. 1B, for each generated test shape (i.e., for the i-th test shape 181 at the i-th iteration of step 640), a test is performed to determine whether an overlap exists between the i-th test shape 181 as generated at step 640 and any of the underlying-conductive-line-level design shapes in the underlying conductive line level, i.e., the Mx level design shapes 120. The test determines whether the i-th test shape 181 does not have any overlap with the Mx level design shapes 120 as illustrated in FIG. 2C, or whether the i-th test shape 181 has any non-zero overlap area with the Mx level design shapes as illustrated in FIG. 3C.

If the test determines that the i-th test shape 181 does not have any overlap with the Mx level design shapes 120 as illustrated in FIG. 2C, the process flow proceeds to step 670 of FIG. 1B. At step 670, the design layout is modified by adding a new design shape to the underlying conductive line level, i.e., the Mx level. The new design shape is herein referred to as an overlay-based design shape 122. This process is illustrated in FIG. 2D. The overlay-based design shape 122 is derived from the i-th stitch shape 180 by laterally and outwardly shifting the edges of the i-th stitch shape by another set of predetermined edge offset parameters. This set of predetermined edge offset parameters is herein referred to as overlay-based edge offset parameters. For example, the overlay-based edge offset parameters can include an x-axis overlay-based edge offset parameter x and a y-axis overlay-based edge offset parameter y. The overlay-based edge offset parameters can be derived from the overlay tolerance for a lithographic process for patterning the conductive line structures (i.e., the M(x+1) level conductive structures) relative to underlying conductive line structures in the underlying conductive line structures (i.e., the Mx level conductive structures). The overlay-based design shape 122 in the underlying conductive line level occupies the entirety of an area of the selected stitch shape, i.e., the i-the stitch shape 180. An underlying conductive line structure that physically manifests the overlay-based design shape 122 in the Mx level in a target interconnect structure is electrically isolated from any other conductive structure except a collateral via structure that is connected to a conductive line structure in the M(x+1) level that physically manifests the design shape in the M(x+1) level that includes the area of the i-th stitch shape 180.

Once all design modification operations are performed with respect to the i-th stitch shape 180, the process flow proceeds to step 685 of FIG. 1B, at which a determination is made as to whether the value of the index i is at the maximum value of N. If not, the process flow proceeds to step 690, at which the value of the index i is incremented by 1. Subsequently, the process flow proceeds to step 640.

If, at step 645, the test determines that the i-th test shape 181 has an overlap with at least one Mx level design shapes 120 as illustrated in FIG. 3C, the process flow proceeds to step 655 of FIG. 1B. At step 655, an automated program can be employed to determine whether the i-th test shape 181 can avoid any overlap with all other design shapes in the underlying conductive line level (i.e., the Mx level) by re-placement and/or rerouting of design shapes in the M(x+1) level and/or the design shapes in the Mx level, or by re-decomposition of the design shape in the M(x+1) level that includes the i-th stitch shape 180. If any new stitch shape is generated by re-decomposition of the design shape in the M(x+1) level that includes the i-th stitch shape 180, the list of stitch shapes prior to the re-decomposition and the list of stitch shapes after the decomposition are compared, and the total count of the stitch shapes the indexing of the stitch shapes are adjusted accordingly.

If the automated program determines that re-placement and/or rerouting of design shapes in the M(x+1) level and/or the design shapes in the Mx level, or re-decomposition of the design shape in the M(x+1) level that includes the i-th stitch shape 180 can eliminate any overlap between the i-th test shape 181 with any other design shapes in the underlying conductive line level (i.e., the Mx level), the process flow proceeds to step 660. At step 660, appropriate modification is made to the design layout so that the i-th test shape 181 in the modified design layout does not have any overlap with any other design shapes in the underlying conductive line level (i.e., the Mx level). Any re-placement, re-routing, and/or re-decomposition methods known in the art may be employed so as to eliminate an overlap between the i-th test shape 181 and the Mx level design shapes 120. An exemplary modification scheme is illustrated in FIG. 3D.

After appropriate modification to the design layout at step 660, the process flow can proceed to step 645. If the modification to the design layout at step 660 is known to eliminate an overlap between the i-th test shape 181 and the Mx level design shapes 120, the process flow can proceed to step 670.

All overlay-based design shapes 122 in the underlying conductive line level are electrically isolated in the modified design layout. Thus, even after formation of a collateral via structure between a physical M(x+1) level line structure implementing the M(x+1) level design shape including a stitch shape and a physical Mx level line structure, the collateral via structure and the physical Mx line structure do not electrically short the physical M(x+1) level line structure to any new node.

If, at step 655, the automated program determines that it is impossible to eliminate an overlap between the i-th test shape 181 and the Mx level design shapes 120 through re-placement and/or rerouting of design shapes in the M(x+1) level and/or the design shapes in the Mx level and/or through re-decomposition of the design shape in the M(x+1) level that includes the i-th stitch shape 180, a determination is made at step 655 on whether the M(x+1) level design shape that includes the i-th stitch shape 180 is electrically connected or electrically isolated.

As used herein, an "electrically isolated" element refers to an element that does not have any electrical connection with any other conductive structure. As such, a physical structure implementing an electrically isolated design shape is electrically floating, i.e., is not applied with any external voltage and does not serve as a current path. For example, an electrically isolated design shape can be a design shape representing a conductive fill portion employed to increase the pattern factor for conductive areas relative to the entire area of the interconnect structure. An electrically isolated design shape can represent a conductive line level structure that is designed to be electrically isolated from any other conductive line level structure or via level structure.

As used herein, an "electrically connected" element refers to an element that has an electrical connection with at least another conductive structure. As such, a physical structure implementing an electrically connected design shape is not electrically floating, and can be applied with any external voltage and serves as a current path. For example, an electrically connected design shape can be a design shape representing a metal line structure or a metal via structure.

If the M(x+1) level design shape that includes the i-th stitch shape 180 is an electrically isolated design shape, a determination is made at step 655 as to whether a design shape among the existing design shapes in the Mx level can overlap the entirety of the overlay-based design shape 122 (See FIG. 3E) derived from the i-th stitch shape 180 through re-placement and/or rerouting of design shapes in the M(x+1) level and/or the design shapes in the Mx level and/or through re-decomposition of the design shape in the M(x+1) level that includes the i-th stitch shape 180. In this case, the overlay-based design shape 122 (See FIG. 3E) derived from the i-th stitch shape 180 is employed as a secondary test shape. If a design shape, whether electrically isolated or electrically connected, among the existing design shapes in the Mx level can overlap the entirety of the overlay-based design shape 122 (See FIG. 3E) derived from the i-th stitch shape 180 through re-placement and/or rerouting of design shapes in the M(x+1) level and/or the design shapes in the Mx level and/or through re-decomposition of the design shape in the M(x+1) level that includes the i-th stitch shape 180, the process flow proceeds to step 660 and an appropriate modification is made to the design layout so that the design shape in the Mx level overlaps the entirety of the overlay-based design shape 122 (See FIG. 3E) derived from the i-th stitch shape 180 after re-placement and/or rerouting of design shapes in the M(x+1) level and/or the design shapes in the Mx level and/or re-decomposition of the design shape in the M(x+1) level that includes the i-th stitch shape 180. In this case, the design shape in the Mx level that overlaps the entirety of the overlay-based design shape 122 (See FIG. 3E) derived from the i-th stitch shape 180 does not introduce any electrical short to a corresponding physical Mx level line structure in a target interconnect structure because a physical M(x+1) level line structure implementing the M(x+1) level design shape including the i-th stitch shape 180 is electrically isolated.

If no design shape among the existing design shapes in the Mx level can overlap the entirety of the overlay-based design shape 122 (See FIG. 3E) derived from the i-th stitch shape 180 even after re-placement and/or rerouting of design shapes in the M(x+1) level and/or the design shapes in the Mx level and/or re-decomposition of the design shape in the M(x+1) level that includes the i-th stitch shape 180, no modification is made to the design layout, and the process flow proceeds to step 685.

If the M(x+1) level design shape that includes the i-th stitch shape 180 is an electrically connected design shape, a determination is made at step 655 as to whether an electrically isolated design shape among the existing design shapes in the Mx level can overlap the entirety of the overlay-based design shape 122 (See FIG. 3E) derived from the i-th stitch shape 180 through re-placement and/or rerouting of design shapes in the M(x+1) level and/or the design shapes in the Mx level and/or through re-decomposition of the design shape in the M(x+1) level that includes the i-th stitch shape 180. If an electrically isolated design shape among the existing design shapes in the Mx level can overlap the entirety of the overlay-based design shape 122 (See FIG. 3E) derived from the i-th stitch shape 180 through re-placement and/or rerouting of design shapes in the M(x+1) level and/or the design shapes in the Mx level and/or through re-decomposition of the design shape in the M(x+1) level that includes the i-th stitch shape 180, the process flow proceeds to step 660 and an appropriate modification is made to the design layout so that the electrically isolated design shape overlaps the entirety of the overlay-based design shape 122 (See FIG. 3E) derived from the i-th stitch shape 180 after re-placement and/or rerouting of design shapes in the M(x+1) level and/or the design shapes in the Mx level and/or re-decomposition of the design shape in the M(x+1) level that includes the i-th stitch shape 180. In this case, the design shape in the Mx level that overlaps the entirety of the overlay-based design shape 122 (See FIG. 3E) derived from the i-th stitch shape 180 does not introduce any electrical short to a physical M(x+1) level line structure implementing the M(x+1) level design shape including the i-th stitch shape in a target interconnect structure because a physical Mx level line structure corresponding to the design shape in the Mx level is electrically isolated.

If no electrically isolated design shape among the existing design shapes in the Mx level can overlap the entirety of the overlay-based design shape 122 (See FIG. 3E) derived from the i-th stitch shape 180 even after re-placement and/or rerouting of design shapes in the M(x+1) level and/or the design shapes in the Mx level and/or re-decomposition of the design shape in the M(x+1) level that includes the i-th stitch shape 180, no modification is made to the design layout, and the process flow proceeds to step 685.

Thus, if the design layout is modified based on the i-th stitch shape 180, a design shape overlaps with an entirety of the corresponding test shape (i.e., the overlay-based design shape 122 (See FIG. 3E) derived from the i-th stitch shape 180) irrespective of whether a newly added overlay-based design shape is employed or re-placement and/or rerouting and/or re-decomposition are employed.

Further, if the design layout is modified based on the i-th stitch shape 180, at least one of the Mx level design shape (i.e., the underlying conductive-line-level design shape overlapping with the i-th stitch shape 180) and the M(x+1) level design shape (i.e., the conductive-line-level design shape) is electrically isolated in the modified design layout. In one embodiment, the Mx level design shape that overlaps with the i-th stitch shape 180 is electrically isolated in the modified design layout. In another embodiment, the M(x+1) level design shape that overlaps with the i-th stitch shape 180 is electrically isolated in the modified design layout. In yet another embodiment, both of the Mx level design shape that overlaps with the i-th stitch shape 180 and the M(x+1) level design shape are electrically isolated in the modified design layout.

Referring to step 740 of FIG. 4A and FIG. 5C, for the i-th stitch shape 180, an i-th test shape 181 is generated in an upper underlying conductive line level, i.e., the Mx level. The i-th test shape 181 is generated from the i-th stitch shape 180 by outwardly expanding each edge of the i-the stitch shape 180 by a test edge offset parameter selected from a predetermined set of test edge offset parameters. During iterative performance of step 740 as the index i runs from 1 to N, i.e., for each selected stitch shape among the generated stitch shapes, an i-th test shape 181 for each i-th stitch shape 180. Each edge of the i-th test shape 181 is laterally offset from an edge of the selected stitch shape 180 (i.e., the i-th stitch shape) by a predetermined edge offset parameter.

Each predetermined edge offset parameter is a scalar parameter derived from a minimum feature spacing in the upper underlying conductive line level, i.e., the Mx level. The predetermined set of test edge offset parameters can be orientation-dependent, i.e., dependent on the orientation of the edge of the selected stitch shape 180. For example, if an x-y Cartesian system is employed to denote coordinates in the design layout, an x-axis test edge offset parameter kx may be employed for all edges extending along a y-direction, and a y-axis test edge offset parameter ky may be employed for all edges extending along the x-direction. The value of the test edge offset parameters (e.g., kx and ky) may be determined based on the sum of a minimum feature spacing between adjacent conductive structures in the upper underlying conductive line level under the design rules applicable to the design layout and the overlay tolerance of lithographic processes for printing the M(x+1) level shapes relative to the Mx level shapes as defined by process assumptions that are specific to each manufacturing facility. In this case, the predetermined edge offset parameter along each direction can be a scalar not less than the sum of the minimum feature spacing in the upper underlying conductive line level (i.e., the Mx level) along the corresponding direction and the overlay tolerance of the lithographic processes for printing the M(x+1) level shapes relative to the Mx level shapes. For example, if the design rules require a minimum spacing of 60 nm between adjacent conductive line structures in the upper underlying conductive line level along the x-direction and a minimum spacing of 80 nm between adjacent conductive line structures in the upper underlying conductive line level along the y-direction, and if the overlay tolerance for lithographic processes that aligns patterns of the lithographic masks of the M(x+1) level (that correspond to the various colors of the decomposed design shapes in the M(x+1) level) relative to the pattern of the Mx level is 20 nm, the values of kx and ky can be 80 nm and 100 nm, respectively. In one embodiment, the predetermined edge offset parameter along each direction can be a scalar not less than the sum of the minimum feature spacing in the upper underlying conductive line level (i.e., the Mx level) along the corresponding direction and the overlay tolerance of the M(x+1) level patterns relative to the Mx level patterns.

Referring to step 745 of FIG. 4B, for each generated test shape (i.e., for the i-th test shape 181 at the i-th iteration of step 740), a test is performed to determine whether an overlap exists between the i-th test shape 181 as generated at step 740 and any of the underlying-conductive-line-level design shapes in the upper underlying conductive line level, i.e., the Mx level design shapes 120. The test determines whether the i-th test shape 181 does not have any overlap with the Mx level design shapes 120 as illustrated in FIG. 5C, or whether the i-th test shape 181 has any non-zero overlap area with the Mx level design shapes as illustrated in FIG. 6A.

If the test determines that the i-th test shape 181 does not have any overlap with the Mx level design shapes 120 as illustrated in FIG. 5C, the process flow proceeds to step 770 of FIG. 4B. At step 770, the design layout is modified by adding a new design shape to the upper underlying conductive line level, i.e., the Mx level. The new design shape is herein referred to as an overlay-based design shape 122. This process is illustrated in FIG. 5D. The overlay-based design shape 122 is derived from the i-th stitch shape 180 by laterally and outwardly shifting the edges of the i-th stitch shape by another set of predetermined edge offset parameters. This set of predetermined edge offset parameters is herein referred to as overlay-based edge offset parameters. For example, the overly-based edge offset parameters can include an x-axis overlay-based edge offset parameter x and a y-axis overlay-based edge offset parameter y. The overlay-based edge offset parameters can be derived from the overlay tolerance for a lithographic process for patterning the conductive line structures (i.e., the M(x+1) level conductive structures) relative to underlying conductive line structures in the upper underlying conductive line structures (i.e., the Mx level conductive structures). The overlay-based design shape 122 in the upper underlying conductive line level occupies the entirety of an area of the selected stitch shape, i.e., the i-the stitch shape 180. An underlying conductive line structure that physically manifests the overlay-based design shape 122 in the Mx level in a target interconnect structure is electrically isolated from any other conductive structure except a collateral via structure that is connected to a conductive line structure in the M(x+1) level that physically manifests the design shape in the M(x+1) level that includes the area of the i-th stitch shape 180.

Once all design modification operations are performed with respect to the i-th stitch shape 180, the process flow proceeds to step 685 of FIG. 4B, at which a determination is made as to whether the value of the index i is at the maximum value of N. If not, the process flow proceeds to step 690, at which the value of the index i is incremented by 1. Subsequently, the process flow proceeds to step 740.

If, at step 745, the test determines that the i-th test shape 181 has an overlap with at least one Mx level design shapes 120 as illustrated in FIG. 6A, the process flow proceeds to step 755 of FIG. 4B. At step 755, an automated program can be employed to determine whether the i-th test shape 181 can avoid any overlap with all other design shapes in the upper underlying conductive line level (i.e., the Mx level) by re-placement and/or rerouting of design shapes in the M(x+1) level and/or the design shapes in the Mx level, or by re-decomposition of the design shape in the M(x+1) level that includes the i-th stitch shape 180. If any new stitch shape is generated by re-decomposition of the design shape in the M(x+1) level that includes the i-th stitch shape 180, the list of stitch shapes prior to the re-decomposition and the list of stitch shapes after the decomposition are compared, and the total count of the stitch shapes the indexing of the stitch shapes are adjusted accordingly.

If the automated program determines that re-placement and/or rerouting of design shapes in the M(x+1) level and/or the design shapes in the Mx level, or re-decomposition of the design shape in the M(x+1) level that includes the i-th stitch shape 180 can eliminate any overlap between the i-th test shape 181 with any other design shapes in the upper underlying conductive line level (i.e., the Mx level), the process flow proceeds to step 760. At step 760, appropriate modification is made to the design layout so that the i-th test shape 181 in the modified design layout does not have any overlap with any other design shapes in the upper underlying conductive line level (i.e., the Mx level). Any re-placement, re-routing, and/or re-decomposition methods known in the art may be employed so as to eliminate an overlap between the i-th test shape 181 and the Mx level design shapes 120.

After appropriate modification to the design layout at step 760, the process flow can proceed to step 745. If the modification to the design layout at step 760 is known to eliminate an overlap between the i-th test shape 181 and the Mx level design shapes 120, the process flow can proceed to step 770.

All overlay-based design shapes 122 in the upper underlying conductive line level are electrically isolated in the modified design layout. Thus, even after formation of a collateral via structure between a physical M(x+1) level line structure implementing the M(x+1) level design shape including a stitch shape and a physical Mx level line structure, the collateral via structure and the physical Mx line structure do not electrically short the physical M(x+1) level line structure to any new node.

If, at step 755, the automated program determines that it is impossible to eliminate an overlap between the i-th test shape 181 and the Mx level design shapes 120 through re-placement and/or rerouting of design shapes in the M(x+1) level and/or the design shapes in the Mx level and/or through re-decomposition of the design shape in the M(x+1) level that includes the i-th stitch shape 180, a determination is made at step 755 on whether the M(x+1) level design shape that includes the i-th stitch shape 180 is electrically connected or electrically isolated.

If the M(x+1) level design shape that includes the i-th stitch shape 180 is an electrically isolated design shape, a determination is made at step 755 as to whether a design shape among the existing design shapes in the Mx level can overlap the entirety of the overlay-based design shape 122 (See FIG. 5D) derived from the i-th stitch shape 180 through re-placement and/or rerouting of design shapes in the M(x+1) level and/or the design shapes in the Mx level and/or through re-decomposition of the design shape in the M(x+1) level that includes the i-th stitch shape 180. In this case, the overlay-based design shape 122 (See FIG. 5D) derived from the i-th stitch shape 180 is employed as a secondary test shape. If a design shape, whether electrically isolated or electrically connected, among the existing design shapes in the Mx level can overlap the entirety of the overlay-based design shape 122 (See FIG. 5D) derived from the i-th stitch shape 180 through re-placement and/or rerouting of design shapes in the M(x+1) level and/or the design shapes in the Mx level and/or through re-decomposition of the design shape in the M(x+1) level that includes the i-th stitch shape 180, the process flow proceeds to step 760 and an appropriate modification is made to the design layout so that the design shape in the Mx level overlaps the entirety of the overlay-based design shape 122 (See FIG. 5D) derived from the i-th stitch shape 180 after re-placement and/or rerouting of design shapes in the M(x+1) level and/or the design shapes in the Mx level and/or re-decomposition of the design shape in the M(x+1) level that includes the i-th stitch shape 180. In this case, the design shape in the Mx level that overlaps the entirety of the overlay-based design shape 122 (See FIG. 5D) derived from the i-th stitch shape 180 does not introduce any electrical short to a corresponding physical Mx level line structure in a target interconnect structure because a physical M(x+1) level line structure implementing the M(x+1) level design shape including the i-th stitch shape 180 is electrically isolated.

If no design shape among the existing design shapes in the Mx level can overlap the entirety of the overlay-based design shape 122 (See FIG. 5D) derived from the i-th stitch shape 180 even after re-placement and/or rerouting of design shapes in the M(x+1) level and/or the design shapes in the Mx level and/or re-decomposition of the design shape in the M(x+1) level that includes the i-th stitch shape 180, no modification is made to the design layout at this step, and the process flow proceeds to step 840 of FIG. 4C.

If the M(x+1) level design shape that includes the i-th stitch shape 180 is an electrically connected design shape, a determination is made at step 755 as to whether an electrically isolated design shape among the existing design shapes in the Mx level can overlap the entirety of the overlay-based design shape 122 (See FIG. 5D) derived from the i-th stitch shape 180 through re-placement and/or rerouting of design shapes in the M(x+1) level and/or the design shapes in the Mx level and/or through re-decomposition of the design shape in the M(x+1) level that includes the i-th stitch shape 180. If an electrically isolated design shape among the existing design shapes in the Mx level can overlap the entirety of the overlay-based design shape 122 (See FIG. 5D) derived from the i-th stitch shape 180 through re-placement and/or rerouting of design shapes in the M(x+1) level and/or the design shapes in the Mx level and/or through re-decomposition of the design shape in the M(x+1) level that includes the i-th stitch shape 180, the process flow proceeds to step 760 and an appropriate modification is made to the design layout so that the electrically isolated design shape overlaps the entirety of the overlay-based design shape 122 (See FIG. 5D) derived from the i-th stitch shape 180 after re-placement and/or rerouting of design shapes in the M(x+1) level and/or the design shapes in the Mx level and/or re-decomposition of the design shape in the M(x+1) level that includes the i-th stitch shape 180. In this case, the design shape in the Mx level that overlaps the entirety of the overlay-based design shape 122 (See FIG. 5D) derived from the i-th stitch shape 180 does not introduce any electrical short to a physical M(x+1) level line structure implementing the M(x+1) level design shape including the i-th stitch shape in a target interconnect structure because a physical Mx level line structure corresponding to the design shape in the Mx level is electrically isolated.

If no electrically isolated design shape among the existing design shapes in the Mx level can overlap the entirety of the overlay-based design shape 122 (See FIG. 5D) derived from the i-th stitch shape 180 even after re-placement and/or rerouting of design shapes in the M(x+1) level and/or the design shapes in the Mx level and/or re-decomposition of the design shape in the M(x+1) level that includes the i-th stitch shape 180 no modification is made to the design layout at this step, and the process flow proceeds to step 840 of FIG. 4C.

Thus, if the design layout is modified based on the i-th stitch shape 180, a design shape overlaps with an entirety of the corresponding test shape (i.e., the overlay-based design shape 122 (See FIG. 5D) derived from the i-th stitch shape 180) irrespective of whether a newly added overlay-based design shape is employed or re-placement and/or rerouting and/or re-decomposition are employed.

Further, if the design layout is modified based on the i-th stitch shape 180, at least one of the Mx level design shape (i.e., the underlying-conductive-line-level design shape overlapping with the i-th stitch shape 180) and the M(x+1) level design shape (i.e., the conductive-line-level design shape) is electrically isolated in the modified design layout. In one embodiment, the Mx level design shape that overlaps with the i-th stitch shape 180 is electrically isolated in the modified design layout. In another embodiment, the M(x+1) level design shape that overlaps with the i-th stitch shape 180 is electrically isolated in the modified design layout. In yet another embodiment, both of the Mx level design shape that overlaps with the i-th stitch shape 180 and the M(x+1) level design shape are electrically isolated in the modified design layout.

Referring to step 840 of FIGS. 4C and 6B, for the i-th stitch shape 180, a i-th secondary test shape 182 is generated in an upper underlying conductive line level, i.e., the Mx level. The i-th secondary test shape 182 is another test shape that is generated from the i-th stitch shape 180. The i-th secondary test shape 182 is generated by outwardly expanding each edge of the i-th stitch shape 180 by a test edge offset parameter selected from another predetermined set of test edge offset parameters, which is herein referred to as a secondary set of test edge offset parameters. During iterative performance of step 740 as the index i runs from 1 to N, i.e., for each selected stitch shape among the generated stitch shapes, a i-th secondary test shape 182 for each i-th stitch shape 180. Each edge of the i-th secondary test shape 182 is laterally offset from an edge of the selected stitch shape 180 (i.e., the i-th stitch shape) by a secondary edge offset parameter selected from the secondary set of test edge offset parameters.

Each secondary edge offset parameter is a scalar parameter derived the overlay tolerance of lithographic processes for printing the M(x+1) level shapes relative to the Mx level shapes as defined by process assumptions that are specific to each manufacturing facility. In this case, the secondary edge offset parameter along each direction can be a scalar not less than the overlay tolerance of the lithographic processes for printing the M(x+1) level shapes relative to the Mx level shapes. In FIG. 6B, lx refers to the secondary edge offset parameter along the x-direction (i.e., an x-axis secondary edge offset parameter), and ly refers to the secondary edge offset parameter along the y-direction (i.e., a y-axis secondary edge offset parameter). For example, if the overlay tolerance for lithographic processes that aligns patterns of the lithographic masks of the M(x+1) level (that correspond to the various colors of the decomposed design shapes in the M(x+1) level) relative to the pattern of the Mx level is 20 nm along the x-direction and 25 nm along the y-direction, the values of lx and ly can be 20 nm and 25 nm, respectively. In one embodiment, the secondary edge offset parameter along each direction can be a scalar not less than the overlay tolerance of the M(x+1) level patterns relative to the Mx level patterns.

Referring to step 845 of FIG. 4C, for each generated secondary test shape (i.e., for the i-th secondary test shape 182 generated at the i-th iteration of step 840), a test is performed to determine whether an overlap exists between the i-th secondary test shape 182 as generated at step 840 and any of the underlying-conductive-line-level design shapes in the upper underlying conductive line level, i.e., the Mx level design shapes 120. The test determines whether the i-th secondary test shape 182 does not have any overlap with the Mx level design shapes 120 as illustrated in FIG. 6D, or whether the i-th secondary test shape 182 has any non-zero overlap area with the Mx level design shapes.

Figure 6C:
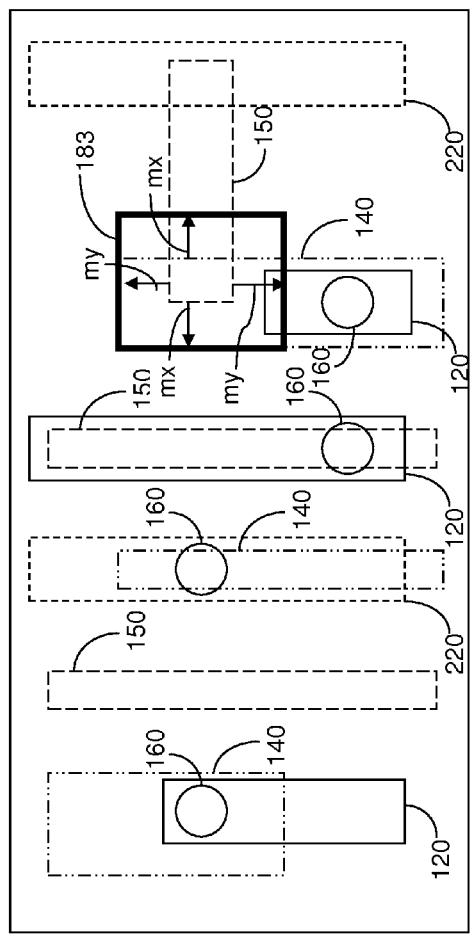
FIG. 6C is a plan view of the fourth exemplary design layout after generation of a tertiary test shape from the stitch shape according to the third embodiment of the present disclosure.
Figure 6D:
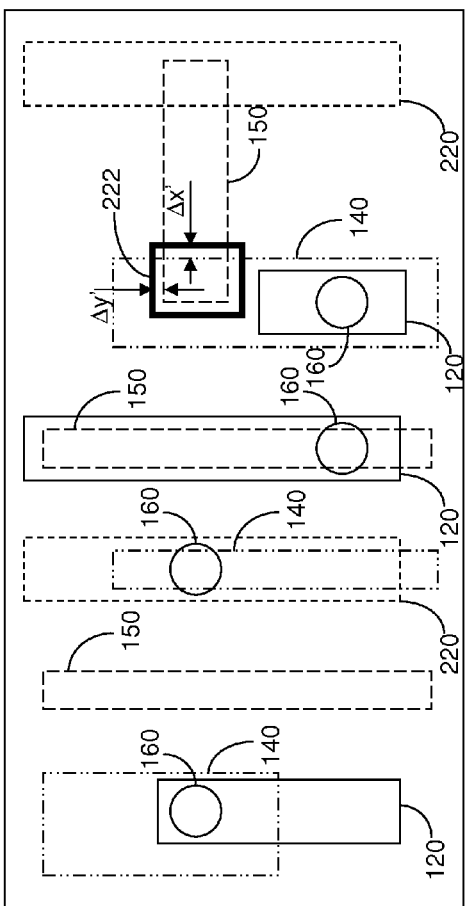
FIG. 6D is a plan view of the fourth exemplary design layout after addition of a new design shape in a lower underlying conductive line level according to the third embodiment of the present disclosure.

If the test determines that the i-th secondary test shape 182 does not have any overlap with the Mx level design shapes 120 as illustrated in FIG. 6D, the process flow proceeds to step 940 of FIG. 4D.

If, at step 845, the test determines that the i-th secondary test shape 182 has an overlap with at least one Mx level design shapes 120, the process flow proceeds to step 855 of FIG. 4C. At step 855, an automated program can be employed to determine whether the i-th secondary test shape 182 can avoid any overlap with all other design shapes in the upper underlying conductive line level (i.e., the Mx level) by re-placement and/or rerouting of design shapes in the M(x+1) level and/or the design shapes in the Mx level, or by re-decomposition of the design shape in the M(x+1) level that includes the i-th stitch shape 180. If any new stitch shape is generated by re-decomposition of the design shape in the M(x+1) level that includes the i-th stitch shape 180, the list of stitch shapes prior to the re-decomposition and the list of stitch shapes after the decomposition are compared, and the total count of the stitch shapes the indexing of the stitch shapes are adjusted accordingly.

If the automated program determines that re-placement and/or rerouting of design shapes in the M(x+1) level and/or the design shapes in the Mx level, or re-decomposition of the design shape in the M(x+1) level that includes the i-th stitch shape 180 can eliminate any overlap between the i-th secondary test shape 182 with any other design shapes in the upper underlying conductive line level (i.e., the Mx level), the process flow proceeds to step 860. At step 860, appropriate modification is made to the design layout so that the i-th secondary test shape 182 in the modified design layout does not have any overlap with any other design shapes in the upper underlying conductive line level (i.e., the Mx level). Any re-placement, re-routing, and/or re-decomposition methods known in the art may be employed so as to eliminate an overlap between the i-th secondary test shape 182 and the Mx level design shapes 120.

After appropriate modification to the design layout at step 860, the process flow can proceed to step 845. If the modification to the design layout at step 760 is known to eliminate an overlap between the i-th secondary test shape 182 and the Mx level design shapes 120, the process flow can proceed to step 940.

If, at step 855, the automated program determines that it is impossible to eliminate an overlap between the i-th secondary test shape 182 and the Mx level design shapes 120 through re-placement and/or rerouting of design shapes in the M(x+1) level and/or the design shapes in the Mx level and/or through re-decomposition of the design shape in the M(x+1) level that includes the i-th stitch shape 180, the process flow proceeds to step 685 of FIG. 4B.

Referring to step 940 of FIG. 4D and FIG. 6C, an i-th tertiary test shape 181 is generated in the lower underlying conductive line level, i.e., the M(x−1) level. The i-th tertiary test shape 183 is generated from the i-th stitch shape 180 by outwardly expanding each edge of the i-th stitch shape 180 by a test edge offset parameter selected from a tertiary set of test edge offset parameters. The i-th tertiary test shape 183 is generated only if step 940 is performed while the value of the index is i, and therefore, the total number of tertiary test shapes 183 may be less than, or equal to, the maximum number N for the index i. Each edge of the i-th tertiary test shape 183 is laterally offset from an edge of the selected stitch shape 180 (i.e., the i-th stitch shape) by a tertiary edge offset parameter, which is a predetermined edge offset parameter.

Each tertiary edge offset parameter is a scalar parameter derived from a minimum feature spacing in the lower underlying conductive line level, i.e., the M(x−1) level. The tertiary set of test edge offset parameters can be orientation-dependent, i.e., dependent on the orientation of the edge of the selected stitch shape 180. For example, if an x-y Cartesian system is employed to denote coordinates in the design layout, an x-axis tertiary test edge offset parameter mx may be employed for all edges extending along a y-direction, and a y-axis tertiary test edge offset parameter my may be employed for all edges extending along the x-direction. The value of the tertiary test edge offset parameters (e.g., mx and my) may be determined based on the sum of a minimum feature spacing between adjacent conductive structures in the lower underlying conductive line level under the design rules applicable to the design layout and the overlay tolerance of lithographic processes for printing the M(x+1) level shapes relative to the M(x−1) level shapes as defined by process assumptions that are specific to each manufacturing facility. In this case, the predetermined edge offset parameter along each direction can be a scalar not less than the sum of the minimum feature spacing in the lower underlying conductive line level (i.e., the M(x−1) level) along the corresponding direction and the overlay tolerance of the lithographic processes for printing the M(x+1) level shapes relative to the M(x−1) level shapes. For example, if the design rules require a minimum spacing of 60 nm between adjacent conductive line structures in the lower underlying conductive line level along the x-direction and a minimum spacing of 80 nm between adjacent conductive line structures in the lower underlying conductive line level along the y-direction, and if the overlay tolerance for lithographic processes that aligns patterns of the lithographic masks of the M(x+1) level (that correspond to the various colors of the decomposed design shapes in the M(x+1) level) relative to the pattern of the M(x−1) level is 20 nm, the values of mx and my can be 80 nm and 100 nm, respectively. In one embodiment, the tertiary edge offset parameter along each direction can be a scalar not less than the sum of the minimum feature spacing in the lower underlying conductive line level (i.e., the M(x−1) level) along the corresponding direction and the overlay tolerance of the M(x+1) level patterns relative to the M(x−1) level patterns.

Referring to step 945 of FIG. 4D, for each generated tertiary test shape, a test is performed to determine whether an overlap exists between the i-th tertiary test shape 183 as generated at step 940 and any of the underlying-conductive-line-level design shapes in the lower underlying conductive line level, i.e., the M(x−1) level design shapes 220. The test determines whether the i-th tertiary test shape 183 has any overlap with the M(x+1) level design shapes 120.

If the test determines that the i-th tertiary test shape 183 does not have any overlap with the M(x−1) level design shapes 220 as illustrated in FIG. 6C, the process flow proceeds to step 970 of FIG. 4B. At step 970, the design layout is modified by adding a new design shape to the lower underlying conductive line level, i.e., the M(x−1) level. The new design shape is herein referred to as an overlay-based design shape 222. This process is illustrated in FIG. 6D. The overlay-based design shape 222 is derived from the i-th stitch shape 180 by laterally and outwardly shifting the edges of the i-th stitch shape by another set of predetermined edge offset parameters. This set of predetermined edge offset parameters is herein referred to as overlay-based edge offset parameters. For example, the overly-based edge offset parameters can include an x-axis overlay-based edge offset parameter x and a y-axis overlay-based edge offset parameter y. The overlay-based edge offset parameters can be derived from the overlay tolerance for a lithographic process for patterning the conductive line structures (i.e., the M(x+1) level conductive structures) relative to lower underlying conductive line structures in the lower underlying conductive line structures (i.e., the M(x−1) level conductive structures). The overlay-based design shape 222 in the lower underlying conductive line level occupies the entirety of an area of the selected stitch shape, i.e., the i-th stitch shape 180. An underlying conductive line structure that physically manifests the overlay-based design shape 222 in the M(x−1) level in a target interconnect structure is electrically isolated from any other conductive structure except a collateral via structure that is connected to a conductive line structure in the M(x+1) level that physically manifests the design shape in the M(x+1) level that includes the area of the i-th stitch shape 180.

Once all design modification operations are performed with respect to the i-th stitch shape 180, the process flow proceeds to step 685 of FIG. 4B, at which a determination is made as to whether the value of the index i is at the maximum value of N. If not, the process flow proceeds to step 690, at which the value of the index i is incremented by 1. Subsequently, the process flow proceeds to step 640.

If, at step 945, the test determines that the i-th tertiary test shape 183 has an overlap with at least one M(x−1) level design shapes 120, the process flow proceeds to step 955 of FIG. 4D. At step 955, an automated program can be employed to determine whether the i-th tertiary test shape 183 can avoid any overlap with all other design shapes in the lower underlying conductive line level (i.e., the M(x−1) level) by re-placement and/or rerouting of design shapes in the M(x+1) level and/or the design shapes in the M(x−1) level, or by re-decomposition of the design shape in the M(x+1) level that includes the i-th stitch shape 180. If any new stitch shape is generated by re-decomposition of the design shape in the M(x+1) level that includes the i-th stitch shape 180, the list of stitch shapes prior to the re-decomposition and the list of stitch shapes after the decomposition are compared, and the total count of the stitch shapes the indexing of the stitch shapes are adjusted accordingly.

If the automated program determines that re-placement and/or rerouting of design shapes in the M(x+1) level and/or the design shapes in the M(x−1) level, or re-decomposition of the design shape in the M(x+1) level that includes the i-th stitch shape 180 can eliminate any overlap between the i-th tertiary test shape 183 with any other design shapes in the lower underlying conductive line level (i.e., the M(x+1) level), the process flow proceeds to step 960. At step 960, appropriate modification is made to the design layout so that the i-th tertiary test shape 183 in the modified design layout does not have any overlap with any other design shapes in the lower underlying conductive line level (i.e., the M(x−1) level). Any re-placement, re-routing, and/or re-decomposition methods known in the art may be employed so as to eliminate an overlap between the i-th tertiary test shape 183 and the M(x−1) level design shapes 220.

After appropriate modification to the design layout at step 960, the process flow can proceed to step 945. If the modification to the design layout at step 960 is known to eliminate an overlap between the i-th tertiary test shape 183 and the M(x−1) level design shapes 220, the process flow can proceed to step 970.

All newly added design shapes 222 in the lower underlying conductive line level are electrically isolated in the modified design layout. Thus, even after formation of a collateral via structure between a physical M(x+1) level line structure implementing the M(x+1) level design shape including a stitch shape and a physical M(x−1) level line structure, the collateral via structure and the physical M(x−1) line structure does not electrically short the physical M(x+1) level line structure to any new node.

If, at step 955, the automated program determines that it is impossible to eliminate an overlap between the i-th tertiary test shape 183 and the M(x−1) level design shapes 220 through re-placement and/or rerouting of design shapes in the M(x+1) level and/or the design shapes in the M(x−1) level and/or through re-decomposition of the design shape in the M(x+1) level that includes the i-th stitch shape 180, a determination is made at step 955 on whether the M(x+1) level design shape that includes the i-th stitch shape 180 is electrically connected or electrically isolated.

If the M(x+1) level design shape that includes the i-th stitch shape 180 is an electrically isolated design shape, a determination is made at step 655 as to whether a design shape among the existing design shapes in the M(x+1) level can overlap the entirety of the overlay-based design shape 222 (See FIG. 6D) derived from the i-th stitch shape 180 through re-placement and/or rerouting of design shapes in the M(x+1) level and/or the design shapes in the M(x−1) level and/or through re-decomposition of the design shape in the M(x+1) level that includes the i-th stitch shape 180. In this case, the overlay-based design shape 222 (See FIG. 6D) derived from the i-th stitch shape 180 is employed as a tertiary test shape. If a design shape, whether electrically isolated or electrically connected, among the existing design shapes in the M(x+1) level can overlap the entirety of the overlay-based design shape 222 (See FIG. 6D) derived from the i-th stitch shape 180 through re-placement and/or rerouting of design shapes in the M(x+1) level and/or the design shapes in the M(x−1) level and/or through re-decomposition of the design shape in the M(x+1) level that includes the i-th stitch shape 180, the process flow proceeds to step 960 and an appropriate modification is made to the design layout so that the design shape in the M(x+1) level overlaps the entirety of the overlay-based design shape 222 (See FIG. 6D) derived from the i-th stitch shape 180 after re-placement and/or rerouting of design shapes in the M(x+1) level and/or the design shapes in the M(x−1) level and/or re-decomposition of the design shape in the M(x+1) level that includes the i-th stitch shape 180. In this case, the design shape in the M(x−1) level that overlaps the entirety of the overlay-based design shape 222 (See FIG. 6D) derived from the i-th stitch shape 180 does not introduce any electrical short to a corresponding physical M(x+1) level line structure in a target interconnect structure because a physical M(x+1) level line structure implementing the M(x+1) level design shape including the i-th stitch shape 180 is electrically isolated.

If no design shape among the existing design shapes in the M(x−1) level can overlap the entirety of the overlay-based design shape 222 (See FIG. 6D) derived from the i-th stitch shape 180 even after re-placement and/or rerouting of design shapes in the M(x+1) level and/or the design shapes in the M(x−1) level and/or re-decomposition of the design shape in the M(x+1) level that includes the i-th stitch shape 180, no modification is made to the design layout, and the process flow proceeds to step 685.

If the M(x+1) level design shape that includes the i-th stitch shape 180 is an electrically connected design shape, a determination is made at step 655 as to whether an electrically isolated design shape among the existing design shapes in the M(x+1) level can overlap the entirety of the overlay-based design shape 222 (See FIG. 6D) derived from the i-th stitch shape 180 through re-placement and/or rerouting of design shapes in the M(x+1) level and/or the design shapes in the M(x−1) level and/or through re-decomposition of the design shape in the M(x+1) level that includes the i-th stitch shape 180. If an electrically isolated design shape among the existing design shapes in the M(x−1) level can overlap the entirety of the overlay-based design shape 222 (See FIG. 6D) derived from the i-th stitch shape 180 through re-placement and/or rerouting of design shapes in the M(x+1) level and/or the design shapes in the M(x−1) level and/or through re-decomposition of the design shape in the M(x+1) level that includes the i-th stitch shape 180, the process flow proceeds to step 960 and an appropriate modification is made to the design layout so that the electrically isolated design shape overlaps the entirety of the overlay-based design shape 222 (See FIG. 6D) derived from the i-th stitch shape 180 after re-placement and/or rerouting of design shapes in the M(x+1) level and/or the design shapes in the M(x−1) level and/or re-decomposition of the design shape in the M(x+1) level that includes the i-th stitch shape 180. In this case, the design shape in the M(x+1) level that overlaps the entirety of the overlay-based design shape 222 (See FIG. 6D) derived from the i-th stitch shape 180 does not introduce any electrical short to a physical M(x+1) level line structure implementing the M(x+1) level design shape including the i-th stitch shape in a target interconnect structure because a physical M(x+1) level line structure corresponding to the design shape in the M(x+1) level is electrically isolated.

If no electrically isolated design shape among the existing design shapes in the M(x−1) level can overlap the entirety of the overlay-based design shape 222 (See FIG. 6D) derived from the i-th stitch shape 180 even after re-placement and/or rerouting of design shapes in the M(x+1) level and/or the design shapes in the M(x−1) level and/or re-decomposition of the design shape in the M(x+1) level that includes the i-th stitch shape 180, no modification is made to the design layout, and the process flow proceeds to step 685.

Thus, if the design layout is modified based on the i-th stitch shape 180, a design shape overlaps with an entirety of the corresponding test shape (i.e., the overlay-based design shape 222 (See FIG. 6D) derived from the i-th stitch shape 180) irrespective of whether a newly added overlay-based design shape is employed or re-placement and/or rerouting and/or re-decomposition are employed.

Further, if the design layout is modified based on the i-th stitch shape 180, at least one of the M(x−1) level design shape (i.e., the underlying conductive-line-level design shape overlapping with the i-th stitch shape 180) and the M(x+1) level design shape (i.e., the conductive-line-level design shape) is electrically isolated in the modified design layout. In one embodiment, the M(x+1) level design shape that overlaps with the i-th stitch shape 180 is electrically isolated in the modified design layout. In another embodiment, the M(x+1) level design shape that overlaps with the i-th stitch shape 180 is electrically isolated in the modified design layout. In yet another embodiment, both of the M(x+1) level design shape that overlaps with the i-th stitch shape 180 and the M(x+1) level design shape are electrically isolated in the modified design layout.

Referring to step 699 of FIGS. 1B and 4B, the automated program can terminate when the value of the index i is determined to be identical to the total number of the stitch shapes (which can be the same as the original number N, or can be a different number as modified during the various steps of the first or second flow chart).

Referring to FIG. 7, an exemplary apparatus is illustrated, which can be employed to implement the methods of various embodiments of the present disclosure. The apparatus can be configured to perform at least one and/or any of the steps in the first or second flow charts in one or more automated steps by running an automated program on any computing means known in the art. The apparatus can be employed to decompose design shapes in a design level into a plurality of target design levels. The apparatus includes one or more processors in communication with a memory and is configured to run an automated program.

The automated program can include any or all of the steps of the first and/or second flow charts. In one embodiment, the apparatus can include at least one computing means 910 including one or more processor units that are in communication with a memory. The at least one computing means 910 can include a computer as known in the art. The at least one computing means 910 can be in communication with a database 920, which can be a standalone computing means or can be incorporated into the at least one computing means 910. The database can store all or a subset of the design shapes for the design levels provided at step 610 or generated at later processing steps. If the database 920 is a standalone computing means, a data cable 930 or wireless communication can be employed to transfer data between the database 920 and the at least one computing means 910. The database can store information on process assumptions, and any or all of predefined parameters to be employed while the automated program runs.

The at least one computing means 910 can be employed to perform at least one or all of the steps described above with, or without, human intervention depending on the program that runs thereupon. The input data and the output data (e.g., the design for a pupil filter according to various embodiments of the present disclosure) can be stored in at least one non-transitory machine-readable data storage medium that can be provided within the at least one computing means 910 and/or within at least one non-transitory machine-readable data storage medium provided within the database 920. The non-transitory machine-readable data storage medium may be of any type known in the art.

One or more non-transitory machine readable medium within the at least one computing means 910 and/or the database 920 can be a portable non-transitory machine-readable data storage medium 942 such as a CD ROM or a DVD ROM. A data-writing device 940 may be provided in the at least one computing means 910 or within the database 920 to enable encoding of the data representing any of the data employed during the various steps in the first and/or second flow chart(s).

The design data can include the various design shapes for the design level as originally provided, and for each and/or all of the various mask level design layouts of the present disclosure. The design data for the mask level design layouts of the present disclosure can be transferred to a manufacturing facility that can manufacture a set of lithographic masks corresponding to the design shapes for the mask level design layouts. The data transfer to the mask writing device can be effected by a portable non-transitory machine-readable data storage medium 942, a data cable (not shown) or by wireless communication.

In one embodiment, the various data employed in the method of the present disclosure, including the design layout, the annotated design layout, any intermediate structure files, and the final structure file, can be in any data format used for the exchange of layout data of integrated circuits and/or symbolic data format (e.g. information stored in a GDSII (GDS2), GL1, OASIS, map files, or any other suitable format for storing such design data structures). The various data may comprise information such as, for example, symbolic data, map files, test data files, design content files, layout parameters, and any other data required by a reticle manufacturer to manufacture a set of at least one reticle encoding the third modified chip design layout.

A machine-readable medium embodying the design data for the mask level design layouts of the present disclosure can have the functionality of generating a representation, in a format perceptible by humans or recognizable by an automated machine (such as an optical character reader or a program configured to recognize graphics data), of a semiconductor structure, a semiconductor device, a semiconductor circuit, or any other physical implementation of the devices and structures of the present disclosure. The design data for the mask level design layouts of the present disclosure, as embodied in the machine-readable medium, can be organized such that the inherent physical or logical relationship among data elements can be represented in a temporary or permanent display device such as a computer monitor or at least one printed sheet of paper. Further, the design data for the mask level design layouts of the present disclosure can be designed to support specific data manipulation functions, including, but not limited to, editing, adding, subtracting, or otherwise modifying or modulating the various data elements within the design data for the mask level design layouts. In addition, the design data for the mask level design layouts of the present disclosure can be configured to cause the representation in the format perceptible by humans or recognizable by an automated machine to include various display elements (e.g., line, curves, symbols, areas, volumes, etc.) that correspond to each of the various data elements within the design data for the mask level design layouts. The design data for the mask level design layouts of the present disclosure can be a functional descriptive material as recorded on the machine-readable medium, and as such, can become structurally and functionally interrelated to the machine-readable medium so as to change the format and organization of the various memory elements within the machine-readable medium and confer a functionality of generating at least one visual representation when read by a display program, which can be a visual display program or a printing program, and can reside in a computing device, or can be encoded within the same machine-readable medium, or can be encoded within a different machine-readable medium that can be read by the same computing device that reads the machine-readable medium encoding the design data for the mask level design layouts of the present disclosure.

In one embodiment, a machine-readable medium embodying the design data for the mask level design layouts of the present disclosure can additionally encode a computer program that enables the generation of a representation, in a format perceptible by humans or recognizable by an automated machine. In one embodiment, the computer program that enables the generation of a representation, in a format perceptible by humans or recognizable by an automated machine can reside in a computing device or in another machine-readable medium that can be read by a computing device configured to read the machine-readable medium embodying the design data for the mask level design layouts of the present disclosure.

Upon running of the computer program on the design data for the mask level design layouts of the present disclosure, a representation of the design data for the t mask level design layouts can be generated in a format perceptible by humans or recognizable by an automated machine, which can be employed to design, manufacture, and/or to test any of a semiconductor structure, a semiconductor device, a semiconductor circuit, or any other physical implementation of the devices, structures and/or circuits of the present disclosure as embodied in the design data for the mask level design layouts. Alternately or additionally, a representation of the design data for the mask level design layouts as generated in a format perceptible by humans or recognizable by an automated machine can be employed to design, manufacture, and/or to test any design for a semiconductor structure, a semiconductor device, a semiconductor circuit, or any other physical implementation of the devices and structures of the present disclosure as embodied in the design data for the mask level design layouts.

Figure 8:
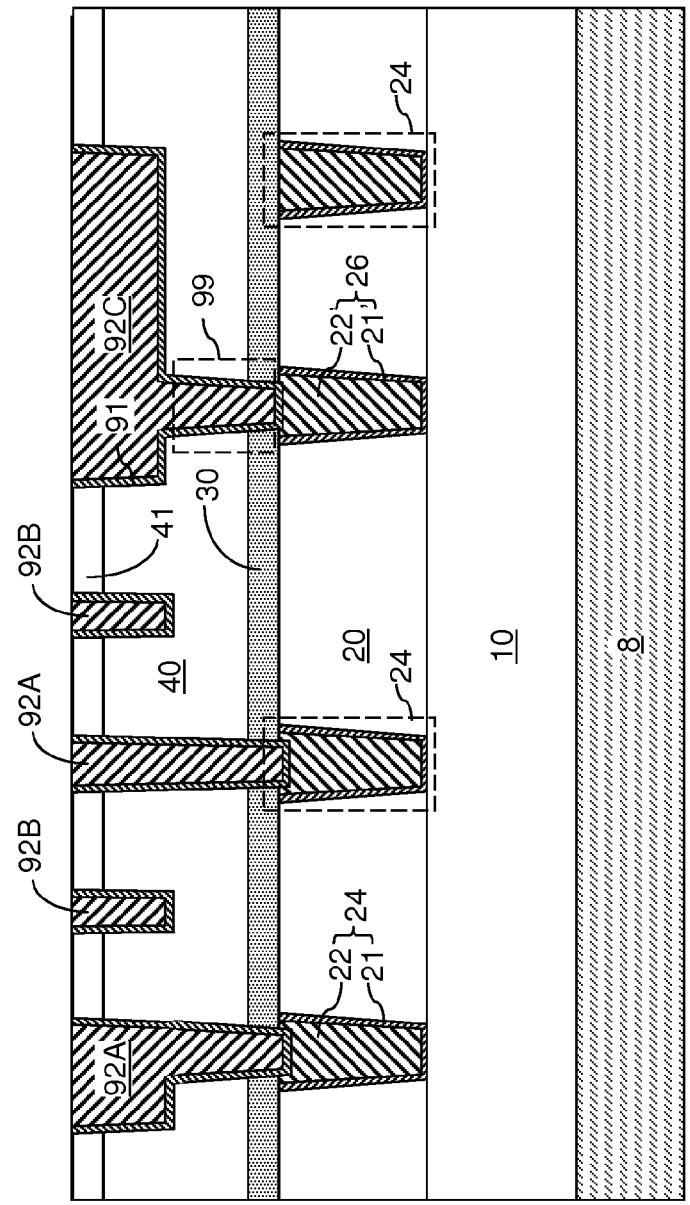
FIG. 8 is a vertical cross-sectional view of a first exemplary interconnect structure according to the first embodiment of the present disclosure.
Figure 9:
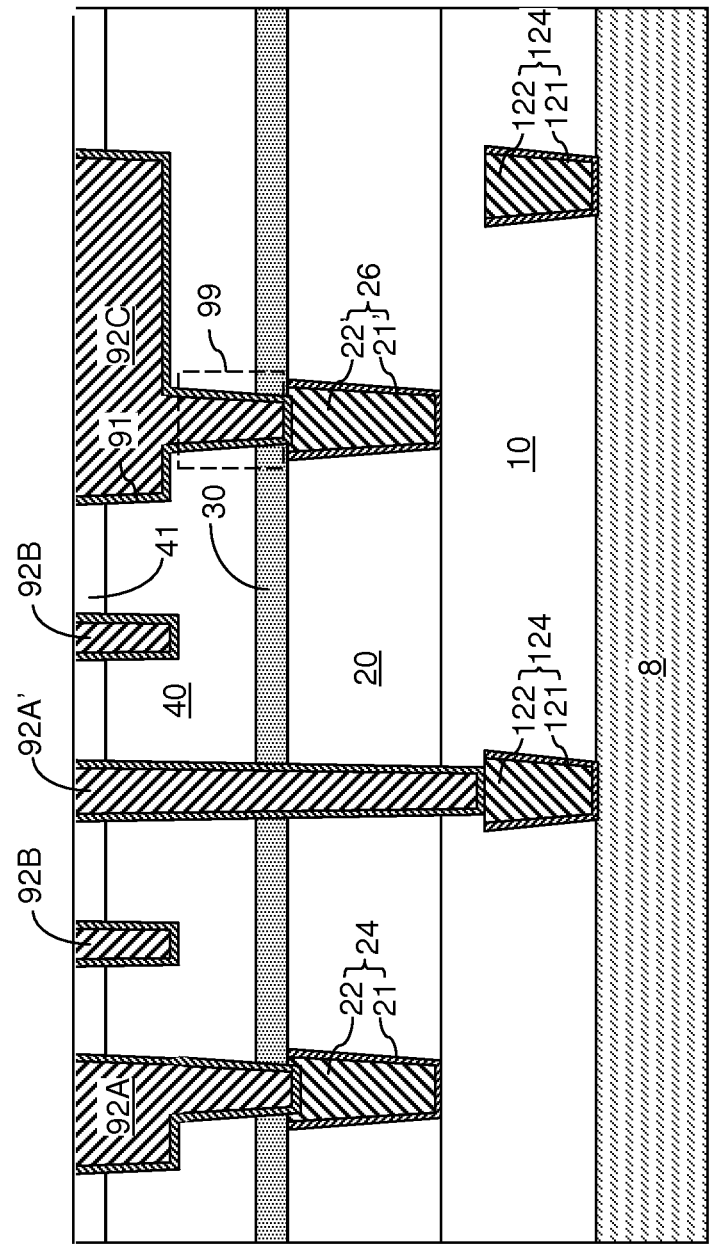
FIG. 9 is a vertical cross-sectional view of a second exemplary interconnect structure according to the second embodiment of the present disclosure.
Figure 10:
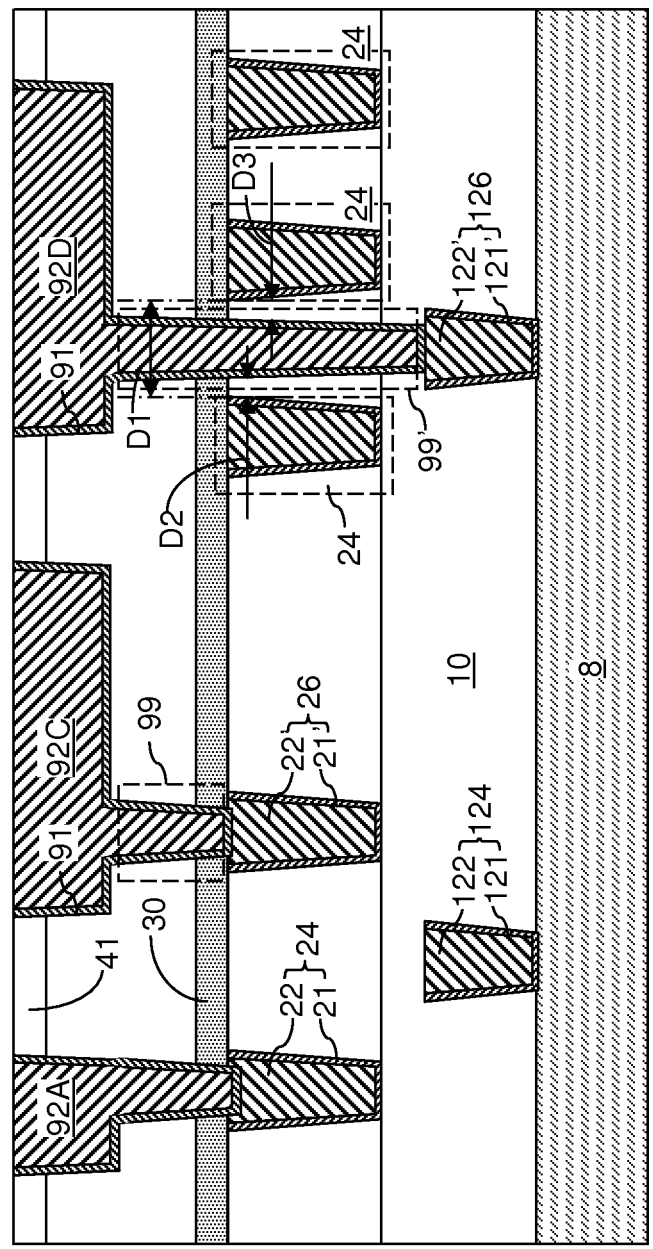
FIG. 10 is a vertical cross-sectional view of a third exemplary interconnect structure according to the second embodiment of the present disclosure.

Referring to FIGS. 8, 9, and 10, vertical cross-sectional views for a first, second, and third exemplary interconnect structures are shown, respectively. The first exemplary interconnect structure can be a target interconnect structure for the first and second exemplary design layouts as modified according to the first embodiment of the present disclosure. The second exemplary interconnect structure can be a target interconnect structure for the third exemplary design layout as modified according to the second embodiment of the present disclosure. The third exemplary interconnect structure can be a target interconnect structure for the fourth exemplary design layout as modified according to the second embodiment of the present disclosure.

Each of the first, second, and third exemplary interconnect structures includes a substrate 8, which can include a semiconductor substrate and at least one semiconductor device thereupon or therein. The substrate 8 may additionally include interconnect structures (not shown).

A stack of dielectric material layers is provided above the substrate 8. The stack of dielectric material layers can include, for example, a first dielectric material layer 10, a second dielectric material layer 20, an optional dielectric cap layer 30, a third dielectric material layer 40, and an optional dielectric hard mask layer 41. The first dielectric material layer 10 may, or may not, be an interconnect-level dielectric material layer, and may, or may not, include line level conductive structures (not shown).

For example, the first dielectric material layer 10 can be an $M(x-1)$ level dielectric material layer, the second dielectric material layer 20 can be an Mx level dielectric material layer, and the third dielectric material layer 30 can be an $M(x+1)$ level dielectric material layer. $M(x-1)$ level conductive line structures (124, 126) may be embedded in the first dielectric material layer 10. Mx level conductive line structures (24, 26) may be embedded in the second dielectric material layer 20. An $M(x+1)$ level conductive line structure 92B and integrated conductive line and via structures (92A, 92A', 92C, 92D) may be embedded in the third dielectric material layer 40. A metallic liner 91 may be included in each of the $M(x+1)$ level conductive line structure 92B and integrated conductive line and via structures (92A, 92A' 92C, 92D).

The $M(x+1)$ level corresponds to the conductive line level. The Mx level corresponds to the underlying conductive line level of the first embodiment and the upper underlying conductive line level of the second embodiment. The $M(x-1)$ level corresponds to the lower underlying conductive line level of the second embodiment.

The Mx level conductive line structures (24, 26) can include interconnect conductive line structures 24 that provide electrical connections among electrical components as known in the art, and at least one via-catching conductive line structure 26. Each via-catching conductive line structure 26 corresponds to the design shape in the underlying conductive line level (i.e., the Mx level) of the first embodiment or in the upper underlying conductive line level (i.e., the Mx level) of the second embodiment that occupies an entirety of an area of an overlapping stitch shape in the $M(x+1)$ level in the design layout. The interconnect conductive line structure 24 can include a metallic liner 21 and a metallic portion 22. The via-catching conductive line structure 26 can include another metallic liner 21' and another metallic portion 22'.

The $M(x-1)$ level conductive line structures (124, 126) can include an interconnect conductive line structure 124 that provide electrical connections among electrical components as known in the art, and a via-catching conductive line structure 126. The via-catching conductive line structure 126 corresponds to the design shape in the lower underlying conductive line level (i.e., M(x−1) level) of the second embodiment that occupies an entirety of an area of an overlapping stitch shape in the M(x+1) level in the design layout. The interconnect conductive line structure 124 can include a metallic liner 121 and a metallic portion 122. The via-catching conductive line structure 126 can include another metallic liner 121' and another metallic portion 122'.

The M(x+1) level conductive line structure 92B is a line level structure that does not extend below the M(x+1) line level, i.e., does not have any via structure attached thereupon. The integrated conductive line and via structures (92A, 92A' 92C, 92D) can include a first-type interconnect integrated conductive line and via structure 92A that provides electrical connections among components across the M(x+1) level and the Mx level as known in the art. Each first-type via structure portion of an interconnect integrated conductive line and via structure 92A corresponds a to via level design shape 160 in a design layout. The integrated conductive line and via structures (92A, 92A' 92C, 92D) can include a second-type interconnect integrated conductive line and via structure 92A' that provides electrical connections among components across the M(x+1) level and the M(x−1) level. Each second-type via structure portion of an interconnect integrated conductive line and via structure 92A' corresponds a to via level design shape 160 in a design layout.

Figure 3E:
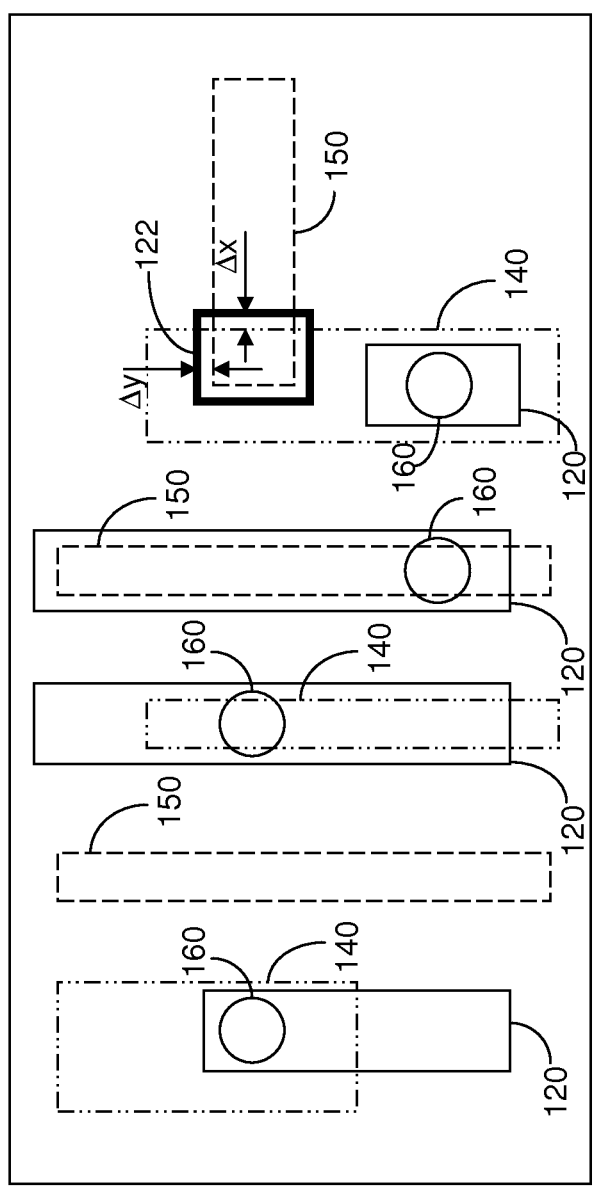
FIG. 3E is a plan view of the second exemplary design layout after addition of a new design shape in the underlying conductive line level according to the first embodiment of the present disclosure.

The integrated conductive line and via structures (92A, 92A', 92C, 92D) can include a first-type stitch-including integrated conductive line and via structure 92C, which corresponds to an M(x+1) level design shape including a stitch in a design layout as illustrated in FIG. 2D, 3E, or 5D. The via structure that is a portion of the first-type stitch-including integrated conductive line and via structure 92C is a collateral via structure 99, which does not have a corresponding via level design shape in the design layout, but is formed due to the stitch present in an M(x+1) level design shape that defines the line structure portion of the first-type stitch-including integrated conductive line and via structure 92C.

The integrated conductive line and via structures (92A, 92A', 92C, 92D) can include a second-type stitch-including integrated conductive line and via structure 92D, which corresponds to an M(x+1) level design shape including a stitch in a design layout as illustrated in FIG. 6D. The via structure that is a portion of the second-type stitch-including integrated conductive line and via structure 92D is a collateral via structure 99', which does not have a corresponding via level design shape in the design layout, but is formed due to the stitch present in an M(x+1) level design shape that defines the line structure portion of the second-type stitch-including integrated conductive line and via structure 92D.

In one embodiment, a spacing between neighboring interconnect conductive line structures 24 (such as the first distance D1 in FIG. 10) can be greater than the minimum spacing between neighboring design shapes according to design rules, and can be not less than a lithographic dimension that can be printed by a single lithographic exposure. However, a lateral distance between a collateral via structure 99' of a second-type stitch-including integrated conductive line and via structure 92D and an interconnect conductive line structure 24 (such as a second distance D2 or a second distance D3 in FIG. 10) can be a sublithographic dimension. A nominal value for the second distance D2 or the third distance D3 can be any number greater than the overlay tolerance between the M(x+1) level and the Mx level. Once the overlay variation is added during the manufacturing process, the second distance D2 and the third distance may even be less than the overlay tolerance.

The various modifications to the design layout according to the various embodiments enable reduction or elimination of collateral via structures that do not contact an underlying conductive line structure. Reduction or elimination of collateral via structures reduces the probability of electrical shorts and metallic contamination of interconnect structures, thereby improving yield of interconnect structures.

While the present disclosure has been described in terms of specific embodiments, it is evident in view of the foregoing description that numerous alternatives, modifications and variations will be apparent to those skilled in the art. Each of the various embodiments of the present disclosure can be implemented alone, or in combination with any other embodiments of the present disclosure unless expressly disclosed otherwise or otherwise impossible as would be known to one of ordinary skill in the art. Accordingly, the present disclosure is intended to encompass all such alternatives, modifications and variations which fall within the scope and spirit of the present disclosure and the following claims.

What is claimed is:

1. A method for generating shapes for a design layout, said method comprising:
    a first step of providing a design layout including a conductive line level, at least one underlying conductive line level, and a via design level, wherein said conductive line level includes conductive-line-level design shapes that represent conductive line structures in a conductive line level in a target interconnect structure, each of said at least one underlying conductive line level includes underlying-conductive-line-level design shapes that represent underlying conductive line structures in an underlying conductive line level located underneath said conductive line level in said target interconnect structure, and said via design level includes via-level design shapes that represent via structures that vertically interconnect said conductive line structures and said underlying conductive line structures, wherein said conductive-line-level design shapes include a plurality of decomposed design shapes having different colors that correspond to different lithographic masks;
    a second step of generating stitch shapes for each region in which a decomposed design shape within said conductive line level intersect with another decomposed design shape having a different color;
    a third step of generating, for each selected stitch shape among said generated stitch shapes, at least one test shape for each of said selected stitch shape, wherein each edge of said at least one test shape is laterally offset from an edge of said selected stitch shape by a predetermined edge offset parameter;
    a fourth step of performing, for each generated at least one test shape, a test to determine whether an overlap exists between one of said at least one generated test shape and any of said underlying-conductive-line-level design shapes in said at least one underlying conductive line level; and
    a fifth step of modifying said design layout so that a design shape in said at least one underlying conductive line level occupies an entirety of an area of said selected stitch shape based on a result of said test,
wherein at least one step among said second, third, fourth, and fifth steps is performed employing an apparatus comprising one or more processors in communication with a memory and configured to perform said at least one step.

2. The method of claim 1, wherein said modifying of said design level comprises adding a new design shape if said test determines that no overlap exists, wherein each edge of said added new design shape is laterally and outwardly shifted from an edge of said selected stitch shape by another predetermined edge offset parameter.

3. The method of claim 2, wherein said predetermined edge offset parameter is a scalar parameter derived from a minimum feature spacing in one of said at least one underlying conductive line level and an overlay tolerance for a lithographic process for patterning said conductive line structures relative to said one of said at least one underlying conductive line structures.

4. The method of claim 2, wherein said another predetermined edge offset parameter is derived from an overlay tolerance for a lithographic process for patterning said conductive line structures relative to underlying conductive line structures in one of said at least one underlying conductive line structures.

5. The method of claim 1, wherein said design shape in said at least one underlying conductive line level is electrically isolated in said design layout.

6. The method of claim 1, wherein a conductive-line-level design shape overlapping with design shape in said at least one underlying conductive line level is electrically isolated in said design layout.

7. The method of claim 1, wherein said design layout is modified through re-placement or rerouting of preexisting design shapes in said design layout as provided.

8. The method of claim 1, wherein said at least one underlying conductive line level is a single underlying conductive line level, and said generated at least one test shape is a generated test shape.

9. The method of claim 1, wherein said at least one underlying conductive line level comprises an upper underlying conductive line level and a lower underlying conductive line level.

10. The method of claim 9, wherein said at least one test shape comprises:
a test shape having edges that are laterally offset from edges of said selected stitch shape by first predetermined edge offset parameters derived from a minimum feature spacing in said upper underlying conductive line level and an overlay tolerance for a lithographic process for patterning said conductive line structures relative to said upper underlying conductive line structures; and
another test shape having edges that are laterally offset from edges of said selected stitch shape by additional predetermined edge offset parameters derived from a minimum feature spacing in said lower underlying conductive line level and an overlay tolerance for a lithographic process for patterning said conductive line structures relative to said lower underlying conductive line structures.

11. An apparatus for generating shapes for a design layout, said apparatus comprising one or more processors in communication with a memory and configured to run an automated program, said automated program including:
a first step of receiving a design layout including a conductive line level, at least one underlying conductive line level, and a via design level, wherein said conductive line level includes conductive-line-level design shapes that represent conductive line structures in a conductive line level in a target interconnect structure, each of said at least one underlying conductive line level includes underlying-conductive-line-level design shapes that represent underlying conductive line structures in an underlying conductive line level located underneath said conductive line level in said target interconnect structure, and said via design level includes via-level design shapes that represent via structures that vertically interconnect said conductive line structures and said underlying conductive line structures, wherein said conductive-line-level design shapes include a plurality of decomposed design shapes having different colors that correspond to different lithographic masks;
a second step of generating stitch shapes for each region in which a decomposed design shape within said conductive line level intersect with another decomposed design shape having a different color;
a third step of generating, for each selected stitch shape among said generated stitch shapes, at least one test shape for each of said selected stitch shape, wherein each edge of said at least one test shape is laterally offset from an edge of said selected stitch shape by a predetermined edge offset parameter;
a fourth step of performing, for each generated at least one test shape, a test to determine whether an overlap exists between one of said at least one generated test shape and any of said underlying-conductive-line-level design shapes in said at least one underlying conductive line level; and
a fifth step of modifying said design layout so that a design shape in said at least one underlying conductive line level occupies an entirety of an area of said selected stitch shape based on a result of said test.

12. The apparatus of claim 11, wherein said modifying of said design level comprises adding a new design shape having another predetermined edge offset parameter if said test determines that no overlap exists.

13. The apparatus of claim 12, wherein said predetermined edge offset parameter is a scalar parameter derived from a minimum feature spacing in one of said at least one underlying conductive line level and an overlay tolerance for a lithographic process for patterning said conductive line structures relative to said one of said at least one underlying conductive line structures.

14. The apparatus of claim 12, wherein said another predetermined edge offset parameter is derived from an overlay tolerance for a lithographic process for patterning said conductive line structures relative to underlying conductive line structures in one of said at least one underlying conductive line structures.

15. The apparatus of claim 11, wherein said design shape in said at least one underlying conductive line level is electrically isolated in said design layout.

16. The apparatus of claim 11, wherein a conductive-line-level design shape overlapping with design shape in said at least one underlying conductive line level is electrically isolated in said design layout.

17. The apparatus of claim 11, wherein said design layout is modified through re-placement or rerouting of preexisting design shapes in said design layout as received.

18. The apparatus of claim 11, wherein said at least one underlying conductive line level is a single underlying conductive line level, and said generated at least one test shape is a generated test shape.

19. The apparatus of claim 11, wherein said at least one underlying conductive line level comprises an upper underlying conductive line level and a lower underlying conductive line level.

20. The apparatus of claim 19, wherein said at least one test shape comprises:

a test shape having edges that are laterally offset from edges of said selected stitch shape by first predetermined edge offset parameters derived from a minimum feature spacing in said upper underlying conductive line level and an overlay tolerance for a lithographic process for patterning said conductive line structures relative to said upper underlying conductive line structures; and another test shape having edges that are laterally offset from edges of said selected stitch shape by additional predetermined edge offset parameters derived from a minimum feature spacing in said lower underlying conductive line level and an overlay tolerance for a lithographic process for patterning said conductive line structures relative to said lower underlying conductive line structures.

* * * * *